US009690002B2

(12) United States Patent
Mallet et al.

(10) Patent No.: US 9,690,002 B2
(45) Date of Patent: Jun. 27, 2017

(54) DEVICE, SYSTEM AND METHOD FOR GEOLOGICAL-TIME REFINEMENT

(71) Applicants: PARADIGM SCIENCES LTD., Grand Cayman (KY); Jean-Laurent Mallet, Luxembourg-Beggen (LU)

(72) Inventors: Jean-Laurent Mallet, Luxembourg-Beggen (LU); Anne-Laure Tertois, Saint Cyr la Riviere (FR)

(73) Assignees: Paradigm Sciences Ltd., Grand Cayman (KY); Jean-Laurent Mallet, Luxembourg-Beggen (LU)

( * ) Notice: Subject to any disclaimer, the term of this patent is extended or adjusted under 35 U.S.C. 154(b) by 0 days.

(21) Appl. No.: 14/743,118

(22) Filed: Jun. 18, 2015

(65) Prior Publication Data

US 2016/0370482 A1    Dec. 22, 2016

(51) Int. Cl.
*G01V 1/36* (2006.01)
*G01V 99/00* (2009.01)
(Continued)

(52) U.S. Cl.
CPC ............... *G01V 1/36* (2013.01); *G01V 1/24* (2013.01); *G01V 1/345* (2013.01); *G01V 99/005* (2013.01);
(Continued)

(58) Field of Classification Search
CPC ........................................................ G01V 1/36
(Continued)

(56) References Cited

U.S. PATENT DOCUMENTS 4,821,164 A    4/1989   Swanson
4,964,099 A    10/1990  Carron
(Continued)

FOREIGN PATENT DOCUMENTS

AU    2002329615    7/2002
CA       2455810    7/2005
(Continued)

OTHER PUBLICATIONS

Launay et al., A Flexible Iterative Method for 3D Reconstruction From X-Ray Projections, 1996, IEEE.*
(Continued)

*Primary Examiner* — Manuel L Barbee
*Assistant Examiner* — Raymond Nimox
(74) *Attorney, Agent, or Firm* — Pearl Cohen Zedek Latzer Baratz LLP

(57) ABSTRACT

A device, system and method for performing a 3D interpolation in a 2D interpolation stage and a 1D interpolation stage to generate a refined geological-time. A 3D model may be obtained of a subsurface region defined by an initial geological-time in the past when particles in the subsurface region are determined to have been originally deposited. The stages of the 3D interpolation may include a 2D interpolation along one or more initial 2D reference horizon surfaces to generate one or more reshaped 2D reference horizon surfaces, and a 1D interpolation based on the initial geological-time along one or more 1D interpolation lines to generate a refined geological-time, wherein each 1D interpolation line is approximately orthogonal to the initial 2D reference horizon surfaces. The 3D model may be displayed according to the refined geological-time.

29 Claims, 7 Drawing Sheets

(51) Int. Cl.
  *G01V 1/24* (2006.01)
  *G01V 1/34* (2006.01)
(52) U.S. Cl.
  CPC .... *G01V 2210/57* (2013.01); *G01V 2210/661* (2013.01); *G01V 2210/74* (2013.01)
(58) Field of Classification Search
  USPC ......................................................... 702/16
  See application file for complete search history.

(56) References Cited

U.S. PATENT DOCUMENTS

| | | |
|---|---|---|
| 4,991,095 A | 2/1991 | Swanson |
| 5,465,323 A | 11/1995 | Mallet |
| 5,475,589 A | 12/1995 | Armitage |
| 5,586,082 A | 12/1996 | Anderson et al. |
| 5,594,807 A | 1/1997 | Liu |
| 5,671,136 A | 9/1997 | Willhoit |
| 5,844,799 A | 12/1998 | Joseph et al. |
| 5,995,907 A | 11/1999 | Van Bemmel et al. |
| 6,018,498 A | 1/2000 | Neff et al. |
| 6,106,561 A | 8/2000 | Farmer |
| 6,138,076 A | 10/2000 | Graf et al. |
| 6,151,555 A | 11/2000 | Van Bemmel et al. |
| 6,246,963 B1 | 6/2001 | Cross et al. |
| 6,278,949 B1 | 8/2001 | Alam |
| 6,353,577 B1 | 3/2002 | Orban et al. |
| 6,597,995 B1 | 7/2003 | Cornu et al. |
| 6,725,174 B2 | 4/2004 | Bouts et al. |
| 6,771,800 B2 | 8/2004 | Keskes et al. |
| 6,778,909 B1 | 8/2004 | Popovici et al. |
| 6,791,900 B2 | 9/2004 | Gillard et al. |
| 6,820,043 B2 | 11/2004 | Mallet et al. |
| 6,847,737 B1 | 1/2005 | Kouri et al. |
| 6,850,845 B2 | 2/2005 | Stark |
| 6,889,142 B2 | 5/2005 | Schonewille |
| 6,904,169 B2 | 6/2005 | Kalevo et al. |
| 7,024,021 B2 | 4/2006 | Dunn et al. |
| 7,089,166 B2 | 8/2006 | Malthe-Sorenssen et al. |
| 7,126,340 B1 | 10/2006 | Ameen et al. |
| 7,187,794 B2 | 3/2007 | Liang et al. |
| 7,227,983 B1 | 6/2007 | Christian et al. |
| 7,248,539 B2 | 7/2007 | Borgos et al. |
| 7,280,918 B2 | 10/2007 | Williams |
| 7,412,363 B2 | 8/2008 | Callegari |
| 7,418,149 B2 | 8/2008 | Dinh et al. |
| 7,446,765 B2 | 11/2008 | Dugge |
| 7,480,205 B2 | 1/2009 | Wei et al. |
| 7,523,024 B2 | 4/2009 | Endres et al. |
| 7,561,992 B2 | 7/2009 | Leflon et al. |
| 7,660,481 B2 | 2/2010 | Schaap et al. |
| 7,711,532 B2 | 5/2010 | Dulac et al. |
| 7,742,875 B2 | 6/2010 | Li et al. |
| 7,744,534 B2 | 6/2010 | Chalana et al. |
| 7,844,402 B2 | 11/2010 | Klein et al. |
| 7,869,954 B2 | 1/2011 | den Boer et al. |
| 7,970,593 B2 | 6/2011 | Roggero et al. |
| 8,010,294 B2 | 8/2011 | Dorn et al. |
| 8,065,088 B2 | 11/2011 | Dorn et al. |
| 8,117,019 B2 | 2/2012 | Sun et al. |
| 8,150,663 B2 | 4/2012 | Mallet |
| 8,219,370 B1 | 7/2012 | DiVerdi et al. |
| 8,274,859 B2 | 9/2012 | Maucec et al. |
| 8,600,708 B1 | 12/2013 | Mallet et al. |
| 8,635,052 B1 | 1/2014 | Mallet et al. |
| 8,711,140 B1 | 4/2014 | Mallet |
| 8,743,115 B1 | 6/2014 | Mallet et al. |
| 2001/0036294 A1 | 11/2001 | Keskes et al. |
| 2002/0032550 A1 | 3/2002 | Ward et al. |
| 2003/0018436 A1 | 1/2003 | Stark |
| 2003/0023383 A1 | 1/2003 | Stark et al. |
| 2003/0216897 A1 | 11/2003 | Endres et al. |
| 2004/0122640 A1 | 6/2004 | Dusterhoft |
| 2004/0260476 A1 | 12/2004 | Borgos et al. |
| 2004/0267454 A1 | 12/2004 | Granjeon |
| 2005/0114831 A1 | 5/2005 | Callegari et al. |
| 2005/0216197 A1 | 9/2005 | Zamora et al. |
| 2006/0004522 A1 | 1/2006 | Cacas |
| 2006/0025976 A1 | 2/2006 | Kennon et al. |
| 2006/0122780 A1 | 6/2006 | Cohen et al. |
| 2006/0133206 A1 | 6/2006 | Barnes |
| 2006/0253759 A1 | 11/2006 | Wei |
| 2007/0118293 A1* | 5/2007 | Adams ..................... G01V 1/30 702/14 |
| 2007/0239414 A1 | 10/2007 | Song et al. |
| 2008/0021684 A1 | 1/2008 | Dulac et al. |
| 2008/0232694 A1 | 9/2008 | Sulatycke |
| 2008/0243452 A1 | 10/2008 | Bowers et al. |
| 2008/0273421 A1 | 11/2008 | Koren et al. |
| 2009/0070079 A1 | 3/2009 | Harada |
| 2009/0119076 A1* | 5/2009 | Madatov ................ G01V 1/282 703/2 |
| 2009/0122060 A1 | 5/2009 | Porat et al. |
| 2009/0157322 A1 | 6/2009 | Levin |
| 2009/0204332 A1* | 8/2009 | Lomask ................. G01V 1/301 702/16 |
| 2009/0204377 A1 | 8/2009 | Wagoner et al. |
| 2009/0231955 A1 | 9/2009 | Barnes |
| 2010/0156920 A1 | 6/2010 | Shin et al. |
| 2010/0245347 A1 | 9/2010 | Dorn et al. |
| 2011/0015910 A1 | 1/2011 | Ran et al. |
| 2011/0054857 A1 | 3/2011 | Moguchaya |
| 2011/0115787 A1 | 5/2011 | Kadlec |
| 2011/0264430 A1 | 10/2011 | Tapscott et al. |
| 2011/0313745 A1 | 12/2011 | Mezghani et al. |
| 2012/0037379 A1 | 2/2012 | Hilliard et al. |
| 2012/0072116 A1 | 3/2012 | Dorn et al. |
| 2013/0204598 A1* | 8/2013 | Mallet ................ G06F 17/5009 703/6 |
| 2013/0231903 A1 | 9/2013 | Li et al. |
| 2013/0246031 A1 | 9/2013 | Wu et al. |
| 2013/0262052 A1 | 10/2013 | Mallet et al. |
| 2014/0278106 A1 | 9/2014 | Mallet |
| 2015/0120262 A1 | 4/2015 | Dulac et al. |

FOREIGN PATENT DOCUMENTS

| | | |
|---|---|---|
| EP | 2317348 | 5/2011 |
| FR | 2987903 | 9/2013 |
| GB | 2444506 A | 6/2008 |
| GB | 2444167 B | 3/2011 |
| RU | 2145100 | 1/2000 |
| WO | WO 99/41676 | 8/1999 |
| WO | WO 03/009003 A1 | 1/2003 |
| WO | WO 03/050766 | 6/2003 |
| WO | WO 2006/007466 A2 | 1/2006 |
| WO | WO 2008/005690 | 1/2008 |
| WO | WO 2011/077227 | 6/2011 |
| WO | WO 2013/015764 | 1/2013 |
| WO | WO 2013/028237 | 2/2013 |

OTHER PUBLICATIONS

Zhao, Based on Three-Dimensional Geological Modeling of Geological Section, 2011, IEEE.*
U.S. Appl. No. 14/059,099, filed Oct. 21, 2013, Mallet et el.
U.S. Appl. No. 14/065,713, filed Oct. 29, 2013, Mallet et al.
U.S. Appl. No. 14/189,505, filed Feb. 25, 2014, Mallet.
U.S. Appl. No. 14/485,018, filed Sep. 12, 2014, Hugot et al.
U.S. Appl. No. 13/862,680, filed Apr. 15, 2013, Tertois, et al.
U.S. Appl. No. 14/260,760, filed Apr. 24, 2014, Mallet, et al.
Bakker, "Image Structure Analysis for Seismic Interpretation," doctoral thesis, publicly defended on Jun. 4, 2002.
Carr et al., "Reconstruction and Representation of 3D Objects with Radial Basis Functions," ACM SIGGRAPH 2001, ACM Press New York, Computer Graphics Proceedings, pp. 67-76, 2001 (ISBN 1-58113-374-X).
Caumon et al. "Building and Editing a Sealed Geological Model," Mathematical Geology, vol. 36, No. 4, May 2004; pp. 405-424.
Caumon et al., "Elements for Stochastic Structural Perturbation of Stratigraphic Models," Proc. Petroleum Geostatistics, Sep. 10-14, 2007.

(56) References Cited

OTHER PUBLICATIONS

Chiles et al., "Modelling the Geometry of Geological Units and its Uncertainty in 3D From Structural Data: The Potential-Field Method," Orebody Modelling and Strategic Mine Planning, pp. 313-320, Nov. 22-24, 2004.
Cignoni et al., "Multiresolution Representation and Visualization of Volume Data," IEEE Transactions on Visualizations and Computer Graphics; 3(4), Oct.-Dec. 1997; pp. 352-369.
Claerbout, "Fundamentals of Geophysical Data Processing with Applications to Petroleum Prospecting," Blackwell Scientific Publications, 1985.
Clawson et al., "The Value of 3D Seismic Attributes for Illuminating Deep Water Deposits by Seismic Forward Modeling of the Brushy Canyon Formation," 2003 SEG Annual Meeting, Oct. 26-31, 2003, Dallas, Texas (only Abstract submitted).
Courrioux et al., "3D Volumetric modelling of Cadomian Terranes (Northern Brittany, France): an automatic method using Voronoi diagrams," Tectonophysics 331(1-2), Feb. 2001, pp. 181-196.
Cremeens et al., "On Chronostratigraphy, Pedostratigraphy, and Archaeological Context," Soil Science Society of America, 1995.
Cuisenaire, "Distance Transformations: Fas Algorthms and Applications to Medical Image Processing," Laboratoire de Telecommunications et Teledetection; Oct. 1999.
Davies, "Conditioning Poorly Sampled Gathers for Pre and Post Stack Analysis," Journal of Conference Abstracts, 2002, vol. 7, No. 2, pp. 142-143.
De Groot et al., "How to create and use 3D Wheeler transformed seismic volumes," SEG/New Orleans 2006 Annual Meeting, pp. 1038-1042.
Dorn, "Chapter 13, Interpreting 3-D Seismic Data," The Leading Edge, Sep. 1998, p. 1261-1272.
Dulac, "Advances in chrono-stratigraphic interpretation modeling," First Break, vol. 27, Oct. 2009.
Durand-Riard et al., "Balanced restoration of geological volumes with relaxed meshing constraints," Computers and Geosciences, vol. 36, No. 4, pp. 441-452, Nov. 17, 2010.
EAGE Daily News, "Paradigm is Redefining Interpretation," 2011 EAGE Conference & Exhibition, May 2011.
Egan et al., "Three-Dimensional Modelling and Visualisation in Structural Geology: New Techniques for the Restoration and Balancing of Volumes," Proceedings of GIG Conference on Geological Visualisation—the Intelligent Picture?, British Geological Survey, Oct. 1996.
Escalona et al., Sequence-stratigraphic analysis of Eocene clastic foreland basin deposits in central Lake Maracaibo using high-resolution well correlation and 3-D seismic data, AAPG Bulletin, vol. 90, No. 4, pp. 581-623 (Apr. 2006) (only Abstract submitted).
Frank et al., "3D-reconstruction of Complex Geological Interfaces from Irregularly Distributed and Noisy Point Data," Computers & Geosciences 33 (2007) 932-943.
Frank, "Advanced Visualization and Modeling of Tetrahedral Meshes," Doctorat de l'Institut National Poly technique de Lorraine; pp. 1-140; 2006.
"Geomodeling Releases VisualVoxATTM 6.2 Software—Introducing the Geobody Paintbrush," New Release, Sep. 24, 2007, printed from http://www.geomodeling.com/news_22.htm; on Oct. 5, 2009.
Gibbons, "Seismic Applications Overview," Society of Petroleum Engineers, Aug. 2003, 9 pages.
GoCAD Suite 2.5 2007 User Guide: Parts 1-12, published Sep. 15, 2007.
Harris et al., "Fault Seal Risk Volumes—A New Tool for the Assessment of Reservoir Compartmentalisation" 71st EAGE Conference & Exhibition—Amsterdam, The Netherlands, Jun. 8-11, 2009.
Jayr et al., "The Need for a Correct Geological Modelling Support: the Advent of the UVT-Transform," First Break, vol. 26, Oct. 2008, pp. 73-79.
Jentzsch et al., "Kinematic subsidence modelling of the Lower Rhine Basin," Netherlands Journal of Geosciences, vol. 81, No. 2, pp. 231-239 (2002).

Jones, "Data structures for three-dimensional spatial information systems in geology," Int. J. Geographical Information Systems, 3(1), 1989, pp. 15-30.
Labrunye et al., "New 3D flattened space for seismic interpretation," SEG Houston 2009 International Exposition and Annual Meeting, pp. 1132-1136.
Ledez, "Modelisation D'Objets Naturals par Formulation Implicite," Ecole Nationale Superieure de Geologie; Oct. 28, 2003; pp. 1-158, see English Abstract.
Lee et al., "Pitfalls in Seismic Data Flattening," The Leading Edge, Feb. 2001, pp. 161-164.
Lepage, "Generation de Maillages Tridimensionnels Pour la Simulation des Phenomenes Physiques en Geosciences," Ecole National Superieure de Geologie; Oct. 28, 2003; pp. 1-224, see English Abstract.
Lessenger et al., "An Inverse Stratigraphic Simulation Model: Is stratigraphic Inversion Possible?" Energy Exploration & Exploitation, vol. 14, No. 6, pp. 627-637 (1996) (only Abstract submitted).
Ligtenberg et al., "Sequence Stratigraphic Interpretation in the Wheeler Transformed (Flattened) Seismic Domain," EAGE 68th Conference & Exhibition—Vienna, Austria, Jun. 12-15, 2006.
Liwanag, "Reservoir Characterisation, Introducing geological processes in reservoir models," GEO ExPro Oct. 2005, pp. 28-32.
Lixin, "Topological relations embodied in a generalized tri-prism (GTP) model for a 3D geoscience modeling system," Computers & Geosciences 30(4), May 2004, pp. 405-418.
Lomask et al., "Flattening Without Picking," Geophysics, vol. 71, No. 4, pp. P13-P20, Jul.-Aug. 2006.
Lomask et al., "Flattening Without Picking," Stanford Exploration Project, Report 112, Nov. 11, 2002, pp. 141-150.
Lomask et al., "Update on Flattening Without Picking," Stanford Exploration Project, Report 120, May 3, 2005, pp. 137-159.
Lomask, "Flattening 3-D Seismic Cubes Without Picking," Jan. 8, 2004.
Mallet, "Discrete Smooth Interpolation in Geometric Modelling," Journal of Computer Aided Design, 24(4), 1992, pp. 178-191.
Mallet, "Numerical Earth Models," 2008 EAGE Publications, ISBN 978-90-73781-63-4, p. 147-157.
Mallet, "Space-time Mathematical Framework for Sedimentary Geology," Journal of Mathematical Geology, vol. 36, No. 1, Jan. 2004, pp. 1-32.
Mallet, Geomodeling (Book chapter); Chapter 6; Oxford University Press; cover and preface pp. and pp. 244-315, 2002.
Mallet, *Geomodeling*, Oxford University Press, Sep. 22, 2004 (ISBN 0-19-514460.0).
Mitchum et al., "Seismic Stratigraphy and Global Changes of Sea Level, Part 6: Stratigraphic Interpretation of Seismic Reflection Patterns in Depositional Sequences," received Jan. 6, 1977, accepted Jun. 13, 1977, pp. 117-133.
Monsen et al., "Geological process controlled interpretation based on 3D Wheeler diagram generation," SEG/San Antonio 2007 Annual Meeting, pp. 885-889.
Moretti et al., "KINE3D: a New 3D Restoration Method Based on a Mixed Approach Linking Geometry and Geomechanics," Oil & Gas Science and Techonology, Rev. IFP, vol. 61 (2006), No. 2, pp. 277-289.
Moyen et al., "3D-Parameterization of the 3D Geological Space—The Geochron Model," 9th European Conference on the Mathematics of Oil Recovery, Geological Modelling I, Aug. 30, 2004.
Moyen, "Paramétrisation 3D de L'espace en Géologie Sédimentaire: Le Modèle Geochron Thèse," Doctorat de l'Institut National Polytechnique de Lorraine, Jun. 9, 2005 (original text in French and English translation).
Müller et al. "3D Restoration and mechanical properties," from structure.harvard.edu/projects/restoration, Harvard University Structural Geology and Earth Resources Group, 2005, accessed on Aug. 21, 2012.
O'Malley et al., "Towards Robust Structure-Based Enhancement and Horizon Picking in 3-D Seismic Data," Proceedings of the 2004 IEEE Computer Society Conference on Computer Vision and Pattern Recognition (CVPR '04), 2004, vol. 2, pp. 482-489.
OpendTect Workflows Documentation version 4.2, dGB Beheer B.V., dGB Earth Sciences, Copyright © 2002-2010.

(56) References Cited

OTHER PUBLICATIONS

Oyedele, "3-D High Resolution Seismic Imaging of Middle-Late Quaternary Depositional Systems, Southeast Green Canyon, Sigsbee Escarpment, Gulf of Mexico," Thesis presented to the Faculty of the Dept. of Geosciences at the University of Houston, Aug. 2005.
Paradigm™ SKUA™ 2009 User Guide: Part V Seismic Interpretation Modeling, Feb. 3, 2009.
Rouby et al., "3-D Restoration of Complexly Folded and Faulted Surfaces Using Multiple Unfolding Mechanisms," AAPG Bulletin, vol. 84, No. 6, pp. 805-829 (Jun. 2000).
Rumpf et al., "A Continuous Skeletonization Method Based on Level Sets," Joint Europgraphics—IEEE Symposium on Visualization, pp. 151-157 (2002).
Saito, "New Algorithms for Euclidean Distance Transformation of an n-Dimensional Digitized Picture with Applications," Pattern Recognition, 27(11) 1994; pp. 1551-1565.
Samson et al., "Quantifying the Impact of Structural Uncertainties on Gross-Rock Volume Estimates", SPE 1996, pp. 381-392.
Smith et al., "SUSAN—A New Approach to Low Level Image Processing," International Journal of Computer Vision, 1997, vol. 23, Iss. 1, pp. 45-78.
Souche, "Integration of fault models into unstructured grids and geo-chronological space," 24$^{th}$ GOCAD Meeting, Jun. 2004.
Stark, "Generation of a 3D seismic 'Wheeler Diagram' from a high resolution Age Volume," pp. 782-786, submitted to the 75th Annual SEG Convention, Nov. 6-11, 2005, Houston, TX.
Stark, "Relative Geologic Time (Age) Volumes—Relating Every Seismic Sample to a Geologically Reasonable Horizon," The Leading Edge, Sep. 2004, pp. 928-932.
Terraspark Geosciences, "Geoscience Interpretation Visualization Consortium (GIVC)," http://terraspark.com/GIVC.consort, accessed on May 11, 2006.
Tertois et al., "Editing faults within tetrahedral volume models in real time," In Jolley, S.J., Barr, D., Walsh, J.J. et al. (Eds), Structurally Complex Reservoirs, London, UK: Geological Society of London, Special Publications 2007; v. 292; p. 89-101 (doi: 10.1144/SP292.5).
Tertois et al., Real-time Tetrahedral Volume Editing Accounting for Discontinuities; Ninth International Conference on Computer Aided Design and Computer Graphics (CAD/CG 2005) 2005 IEEE; pp. 1-6).
Tertois, "Création et édition de modèles géologiques par Champs de potentiel: Application au modele GeoChron—Thèse," Institut National Polytechnique de Lorraine, Jun. 21, 2007.
Tertois, Preserving Geological Information During Real-Time Editing of Faults in Tetrahedral Models; Int. Assoc. for Mathematic Geology Xith International Congress Universite de Liege—Belgium; 2006; S14-24; pp. 1-4.
Thomsen et al., "Towards a balanced 3D Kinematic Model of a Faulted Domain—the Bergheim Open Pit Mine, Lower Rhine Basin," Netherlands Journal of Geoscience, vol. 81, No. 2, pp. 241-250 (2002).
Thore et al., Integration of Structural Uncertainties into Reservoir grids construction—70th EAGE Conference & Exhibition—Rome, Italy, Jun. 9-12, 2008.
Trudgill et al., "Integrating 3D Seismic Data with Structural Restorations to Elucidate the Evolution of a Stepped Counter-Regional Salt System, Eastern Louisiana Shelf, Northern Gulf of Mexico," pp. 165-176. (2004).
Wen et al., "Use of Border Regions for Improved Permeability Upscaling," Mathematical Geology, 35(5), Jul. 2003; pp. 521-547.
Wood et al., "Applying Sequence Stratigraphy and Seismic Stratal Slice Technology in the Gulf of Mexico," GASTIPS, Lang et al. (Eds.), Winter 2003, vol. 9, No. 1, pp. 10-21.
Zeng et al., High-frequency Sequence Stratigraphy from Seismic Sedimentology: Applied to Miocene, Vermilion Block 50, Tiget Shoal Area Offshoure Louisiana, AAPG Bulletin, Feb. 2004, vol. 88, No. 2, pp. 153-174 (only Abstract submitted).
Zeng et al., "Interpretive Advantages of 90 Degree-Phase Wavelets: Part 2—Seismic Applications," Geophysics, SEG, vol. 70, No. 3, May 2005-Jun. 2005. pp. C-17-C-24.
Zeng et al., "Seismic Frequency Control on Carbonate Seismic Stratigraphy: A Case Study of the Kingdom Abo Sequence, West Texas," AAPG Bulletin, vol. 87, Issue No. 2, pp. 273-293 (2003) (only Abstract submitted).
Zeng et al., "Stratal Slicing of Miocene-Pliocene Sediments in Vermilion Block 50-Tiger Shoal Area, Offshore Louisiana," The Leading Edge, Offshore Technology Special Section, vol. 20, No. 4, Apr. 2001, pp. 408-418.
Zeng et al., "Stratal Slicing, Part I: Realistic 3-D Seismic Model," Geophysics, Seg, vol. 63, No. 2, Mar. 1998-Apr. 1998, pp. 502-513.
Zeng et al., "Stratal Slicing, Part II: Read 3-D Seismic Data," Geophysics, vol. 63, No. 2 (Mar.-Apr. 1998); pp. 514-522.
Zeng et al., "Three-D Seismic Facies Imaging by Stratal Slicing of Miocene-Pliocene Sediments in Vermilion Block 50-Tiger Shoal Area, Offshore Louisiana," Secondary Gas Recovery, AAPG 2000.
Zeng, "From Seismic Stratigraphy to Seismic Sedimentology: A Sensible Transition," GCAGS Transactions, vol. 51, pp. 413-420 (2001) (only Abstract submitted).
Zeng,"Stratal Slicing: Benefits and Challenges," The Leading Edge 29, 1040 (Sep. 2010).
Zeng et al., "Stratal Slicing and Seismic Facies Imaging," Bureau of Economic Geology, The University of Texas at Austin, 1998. (only Abstract submitted).
Office Action issued for U.S. Appl. No. 11/628,559, mailed on Jun. 24, 2009.
Notice of Allowance issued for U.S. Appl. No. 11/628,559, mailed on Dec. 24, 2009.
Notice of Allowance issued for U.S. Appl. No. 12/791,352 mailed Dec. 6, 2013.
Office Action issued for U.S. Appl. No. 12/791,370, mailed on Nov. 26, 2012.
Notice of Allowance issued for U.S. Appl. No. 12/791,370, mailed on Jul. 22, 2013.
Office Action issued for U.S. Appl. No. 12/791,483, mailed on Aug. 17, 2012.
Office Action issued for U.S. Appl. No. 12/909,981 mailed Aug. 19, 2013.
Notice of Allowance issued for U.S. Appl. No. 12/909,981 mailed Jan. 27, 2014.
Office Action issued for U.S. Appl. No. 14/059,099, mailed on Jun. 16, 2014.
Notice of Allowance issued for U.S. Appl. No. 14/059,099, mailed Oct. 21, 2014.
Office Action issued for U.S. Appl. No. 14/065,713, mailed on Jun. 19, 2014.
Notice of Allowance issued for U.S. Appl. No. 14/065,713, mailed Oct. 20, 2014.
Office Action issued for U.S. Appl. No. 14/189,505, mailed on Dec. 4, 2014.
Office Action issued for U.S. Appl. No. 14/260,760, mailed on Jul. 9, 2014.
Final Office Action issued for U.S. Appl. No. 14/260,760, mailed Nov. 14, 2014.
Final Office Action issued for U.S. Appl. No. 14/260,760, mailed Nov. 25, 2014.
Office Action issued for U.S. Appl. No. 14/211,744, mailed on Jun. 3, 2014.
International Search Report issued for PCT International Application No. PCT/IB2004/002030, issued on Jan. 25, 2005.
Volume Based Method (VBM) Horizon Modeler, http://support.software.slb.com/Knowledgebase/Pages/KBArticles/Petrel/KB6327229.aspx, meta data indicates document created Dec. 10, 2013.
Extended European Search Report issued by the European Patent Office for European Application No. EP 16 17 4160 dated Oct. 24, 2016.

* cited by examiner $T(\lambda \,|\, \mathbf{r}_i^1, \mathbf{r}_{i+1}^1)$     $T(\lambda \,|\, \mathbf{r}_i^2, \mathbf{r}_{i+1}^2)$

DEVICE, SYSTEM AND METHOD FOR GEOLOGICAL-TIME REFINEMENT

FIELD OF THE INVENTION

Embodiments of the invention relate generally to modeling stratified terrains in the subsurface of the Earth, and more particularly to modeling terrains based on the geological time in the past when the subsurface terrains were originally deposited in the Earth.

BACKGROUND OF THE INVENTION

Tectonic activity through time transforms an initially uniform stratified terrain composed of a continuous stack of substantially level surfaces into an uneven terrain that may be eroded, affected by shifts in sedimentary deposition patterns, folded, and/or fractured by faults forming discontinuities across the originally continuous horizons. To model the original past time of deposition, referred to as "geological time", from data collected from the current present-day subsurface structures (e.g., to "reverse time"), a depositional model (e.g. referred to as a "GeoChron" model) may simulate a reversal of such erosion and tectonic activity.

"Geological horizons" are identical or approximate to level-sets of the geological-time. As a consequence, modeling or refining the geological-time may be equivalent to modeling or refining the horizons. The actual geological-time "t" may equivalently be replaced by a given continuous strictly monotonic function F(t) (e.g. a function whose $1^{st}$ derivative never reduces to zero, or a function that is either strictly decreasing or strictly increasing) of the actual geological-time. Such a transformation typically does not change the geometry of the level-sets (e.g. geological horizons). Thus, "geological time" may refer to any continuous strictly monotonic function of the actual or predicted geological time. In the following, as an example provided for the sake of clarity, the geological time may be assumed to be strictly monotonically increasing (e.g. more recent deposited or top layer subsurface particles being relatively younger, such as, deposited at a geological time of 4.5 billion years, than deeper subsurface particles, such as, deposited at a geological time of 4.2 billion years). From a physical perspective, a geological time function that is strictly monotonically increasing may be equivalent to time never stopping and/or never running backwards. Equivalently, the geological time function may be strictly monotonically decreasing. In such a case, all the inequalities referring directly or indirectly to geological time (e.g., equations 14 and 15) may be inverted.

Each particle of sediment observed today in the subsurface was originally deposited at a paleo-geographic location (u,v) and a geologic time (t). The set of particles of sediment sharing a common paleo-geographic location is called an "Iso Paleo Geographic" (IPG) line which consists of a curve approximately orthogonal to the geologic horizons. There are several techniques known in the art to build these IPG lines. According to embodiments of the invention, any point located in the subsurface may be intersected by one (and only one) unique IPG-line.

Generally speaking, depositional models may be generated by applying 3D interpolation techniques to the current time models to determine the geological time throughout the entire sampled volume. Current interpolation techniques for generating depositional models typically use extensive simplifications that often violate for example principles of superposition and minimal energy deformations, thereby rendering inaccurate data. Current interpolation techniques used thus far incorrectly assume that the gradient (e.g. multi-dimensional or directional vector, slope or derivative) of the 3D geological time function t is continuous everywhere within each stratigraphic sequence contained within each fault block, and in particular across some reference horizons.

FIG. 1 shows a vertical cross-section of a present-day geological model where the variations of the geological time function 190 are represented by a grayscale color map. In FIG. 1, the gradient of the geological time function is discontinuous across a horizon 150 (the white curve). The discontinuity of the gradient is particularly visible within regions encircled by ellipses 160. The geological time function 190 across the horizon is $C^0$ (its 0th derivative, i.e., the function itself, is continuous), but not $C^1$ (its first derivative is not continuous). Curve 140 is an IPG-line approximately orthogonal to the horizon (level-set) of the geological time function. Along the IPG-line 140, the spacing (gradient) of the level sets between points 110 and 120 is different from the spacing (gradient) between points 120 and 130. This shows that the geological time function 190 is not $C^1$ at point 120.

FIG. 2 shows the variations of the geological time function 290 (e.g. 190 in FIG. 1), for example, as a 1D function of the curvilinear abscissa along a curve 240 (e.g. function of location along the 1D line 140 in FIG. 1). In practice, the geological time may be defined or measured at a plurality of sampling points, for example, scattered in the geological domain. These sampling points may be used to approximate (e.g. estimate) the geological time as a 3D function everywhere in the geological domain. When the geological domain is traversed by a 1D line 240, the 3D function representing the geological time may be represented by a 1D function of the curvilinear abscissa along this 1D line. For example, in FIG. 2, the vertical axis 290 represents the continuously (e.g. without gaps) interpolated geological time and the horizontal axis 240 represents the curvilinear abscissa along the 1D line 140. The black curve 280 corresponds to a classical $C^1$ interpolation (e.g. where the $1^{st}$ order derivative is continuous) of the geological time function (e.g. an interpolation that results in a $C^1$ geological time) between the points 210 (110 in FIG. 1) and 230 (130 in FIG. 1). The gray curve 270 corresponds to a $C^0$ piecewise linear interpolation (e.g. composed of adjacent straight-line segments) of the geological time function between points 210-220 (110-120 in FIG. 1) and 220-230 (120-130 in FIG. 1). In the neighborhood of point 220 (120 in FIG. 1), the classical $C^1$ interpolation generates a geological time that is not strictly monotonic and oscillates (e.g. increasing and decreasing) along the path of the 1D line 240 (140 in FIG. 1). These oscillations, referred to as the "Gibbs effect," cause a zero gradient (e.g. slope of the curve 280) at the peaks (maxima) 281 and troughs (minima) 282 where the geological-time function is non-monotonic. This non-monotonic behavior of the geological-time function is physically unlikely or impossible because the higher a particle of sediment is located in the stratigraphic column (e.g. along path 240 in FIG. 2 or 140 in FIG. 1), the later the geological time when it was deposited in the Earth. A non-monotonic geological-time function may have level-set surfaces that are closed surfaces, which appear as "bubbles" in the model, and which generally correspond to a physically unacceptable geometry for a geologic horizon. In order to avoid generating such bubbles, a common practice of classical $C^1$ interpolators is to strongly smooth the variations of the geological time function, as illustrated by curve 250. Unfortunately such severe smoothing causes the observed sampling points to be incorrectly fitted. As a consequence, there is a need inherent in the art for "refining" an initial strictly monotonic 3D function approximating the geological time function in order to accurately model geological horizon surfaces, particularly in areas in which the gradient of the geological-time function is discontinuous.

SUMMARY OF EMBODIMENTS OF THE INVENTION

According to an embodiment of the invention, a device, system and method is provided for refining a geological-time (and/or geological horizons), for example, of geological structures composed of geological strata bounded by geological horizons ordered according their geological time of deposition (e.g. the GeoChron model).

In the geological space as observed today, the geometry of the horizons may be intrinsically defined as level-sets of the geological-time function. Therefore, improving the geometry of the horizons in a depositional model of the subsurface may be equivalent to improving or refining the geological-time function. To solve such a model refinement problem, a new approach is proposed, referred to as "Geological-Time Refinement" (GTR). Contrary to classical 3D interpolation methods which typically generate bubbles in the presence of strong lateral variations of layer thickness, the GTR technique models a "refined" geological-time function and associated horizons correctly. As an input, the GTR technique uses a set of given sampling points located on a given series of reference horizons and an initial strictly monotonic 3D geological time function whose level sets approximate the reference horizons. As an output, the GTR technique generates a new refined (e.g. strictly monotonic) approximation of the 3D geological-time function whose level-sets corresponding to the reference horizons better fit the sampling points without forming bubbles.

Rather than using a brute force 3D interpolation of the refined geological-time function, the GTR technique is computationally efficient because it divides the 3D interpolation of the geological time function into a combination of two-dimensional (2D) interpolations and one-dimensional (1D) interpolations. The GTR technique is divided into two stages:

A first stage includes operations performed on a series of one or more initial reference horizons $\{H_{t_1}, \ldots, H_{t_n}\}$ corresponding to level sets of the given initial smooth geological time function at times $\{t_1, \ldots, t_n\}$ respectively:
1. On each initial reference horizon, $H_{t_i}$, a 2D interpolation is executed by interpolating the mismatch between $H_{t_i}$ and each sampling point location x assigned to reference horizon $H_{t_i}$. Since all sediment deposited at geological time $t_i$ should lie along horizon $H_{t_i}$ (i.e. zero mismatch), this mismatch between the observed sampling data point x and horizon $H_{t_i}$ may be measured either as a linear distance or a difference of the initial geological time t(x) at sampling points locations and $t_i$.
2. Each initial reference horizon $H_{t_i}$ is next reshaped to fit the observed data. This reshaping operation involves moving each point "r" of $H_{t_i}$ to a new location "r*" in such a way that the (new) reshaped (refined) reference horizon $\hat{H}^*_{t_i}$ fits the sampling data given as input and corresponding to locations of particles of sediment deposited at geological time $t_i$.

The displacement of point "r∈$H_{t_i}$" to a new location "r*∈$\hat{H}^*_{t_i}$" is performed along a 1D line, e.g. the IPG line, passing through "r" and the magnitude of the displacement corresponds to the mismatch interpolated in 2D on $H_{t_i}$.

In order to maintain geological consistency, the reshaped horizons $\{\hat{H}^*_{t_1}, \ldots, \hat{H}^*_{t_{n1}}\}$ may not intersect each other. For that purpose the 2D interpolation of the mismatch on $\{H_{t_1}, \ldots, H_{t_n}\}$ may be performed simultaneously in a coherent way (described in more detail below). If the goal of interpolating is only to refine the geometry of the reference horizons, some embodiments of the GTR technique may stop after the first stage above. If however a goal is to interpolate the associated refined geological time in the geological domain, some embodiments of the GTR technique may proceed to the second stage below:

A second stage is a series of one or more 1D piecewise-linear ($C^0$) interpolations of the refined geological time function, for example, along a series of 1D lines approximately orthogonal to the 2D reference horizons, such as, along iso-paleo-geographic (IPG) lines. Each 1D piecewise-linear interpolation may calculate geological-time values for points along a 1D line between pairs of the 2D reshaped surfaces $\{\hat{H}^*_{t_1}, \ldots, \hat{H}^*_{t_n}\}$. The 1D interpolations may be performed simultaneously, or in parallel, along a plurality of the 1D lines. In practice, such 1D interpolation of the refined geological time function may be performed almost at any location in the 3D geological studied domain (e.g. excluding locations within "shadow regions" described below). As a result, the refined geological time function may then be defined (almost) everywhere in the 3D geological domain. As illustrated by the piecewise-linear curve 270 in FIG. 2, the piecewise linearity of the 1D interpolations along the 1D lines ensures that the refined geological time function is monotonic and is unaffected by the Gibbs effect. As described later, some limited "shadow regions" may remain near faults where 1D lines intersect only one reshaped surface. In such a case, the refined geological time function may not be linearly interpolated along 1D lines and may be extrapolated in 3D.

The interpolated mismatch of various points on the 2D surfaces (in the 2D interpolation stage) and along the 1D lines (in the 1D interpolation stage) may be refined while adhering to one or more constraints. In one example, the interpolation may be constrained to prevent the reshaped versions $\{\hat{H}^*_{t_1}, \ldots, \hat{H}^*_{t_n}\}$ of the horizons (2D surfaces) from intersecting each other. In some embodiments, the GTR technique may skip the first 2D interpolation stage for some reference horizons and only execute the second 1D interpolation stage, for example, when the 2D horizon surfaces are considered (e.g. by an automated mechanism or manually by geologists) as sufficiently accurate in the initial input model.

According to some embodiments of the invention, this two-stage approach may overcome the aforementioned deficiencies of the prior art, by providing a separate 1D interpolation stage that allows discontinuities of the gradient of the geological time function across reshaped reference horizons to be taken into account, for example within a fault block. By allowing discontinuities of the gradient of the geological time function (e.g. not $C^1$) while preserving continuity of the geological-time function (e.g. $C^0$), the refined model may maintain a strictly monotonic geological time function within each fault block, thereby preventing "bubbles" from forming in the models. This type of refinement presents an important advantage to accurately model such gradient discontinuities that occur in geology, for example, at a passive margin (e.g. a transition between oceanic and continental lithosphere as shown in FIG. 1). In addition, by dividing a 3D interpolation into two separate 1D and 2D interpolation stages, embodiments of the invention may significantly simplify the computational complexity of the 3D interpolation, thereby reducing the computation effort and/or time to improve the function of the computer performing the interpolation.

These, additional, and/or other aspects and/or advantages of embodiments of the invention are set forth in the detailed description which follows, possibly inferable from the detailed description, and/or learnable by practice of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
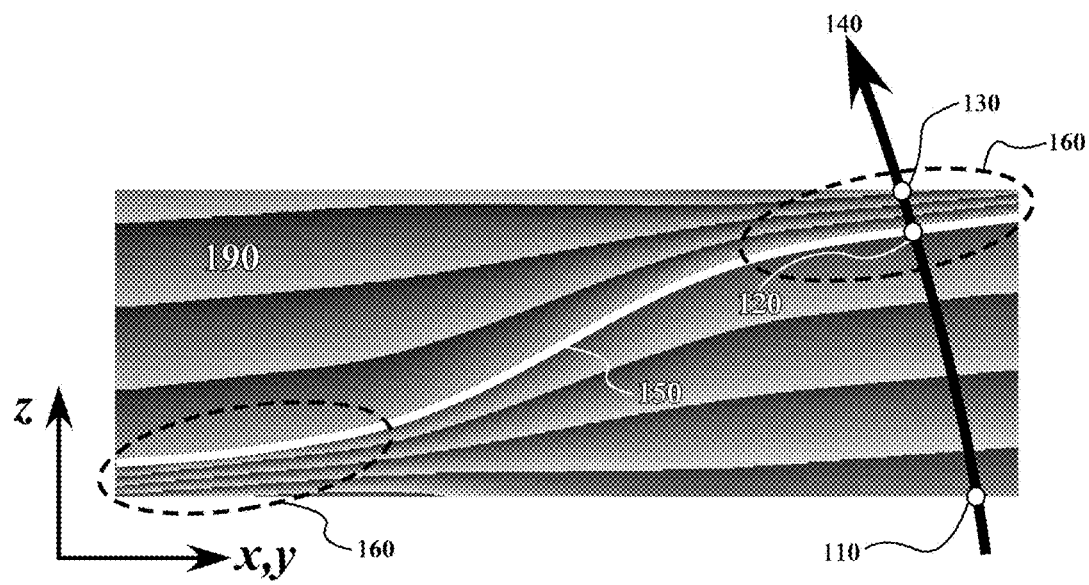
FIG. 1 is a schematic illustration of a vertical cross-section of a present-day model with rapid lateral variations of layer thickness between horizons, where the gradient of the geological time is locally discontinuous across a horizon 150, in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 3:
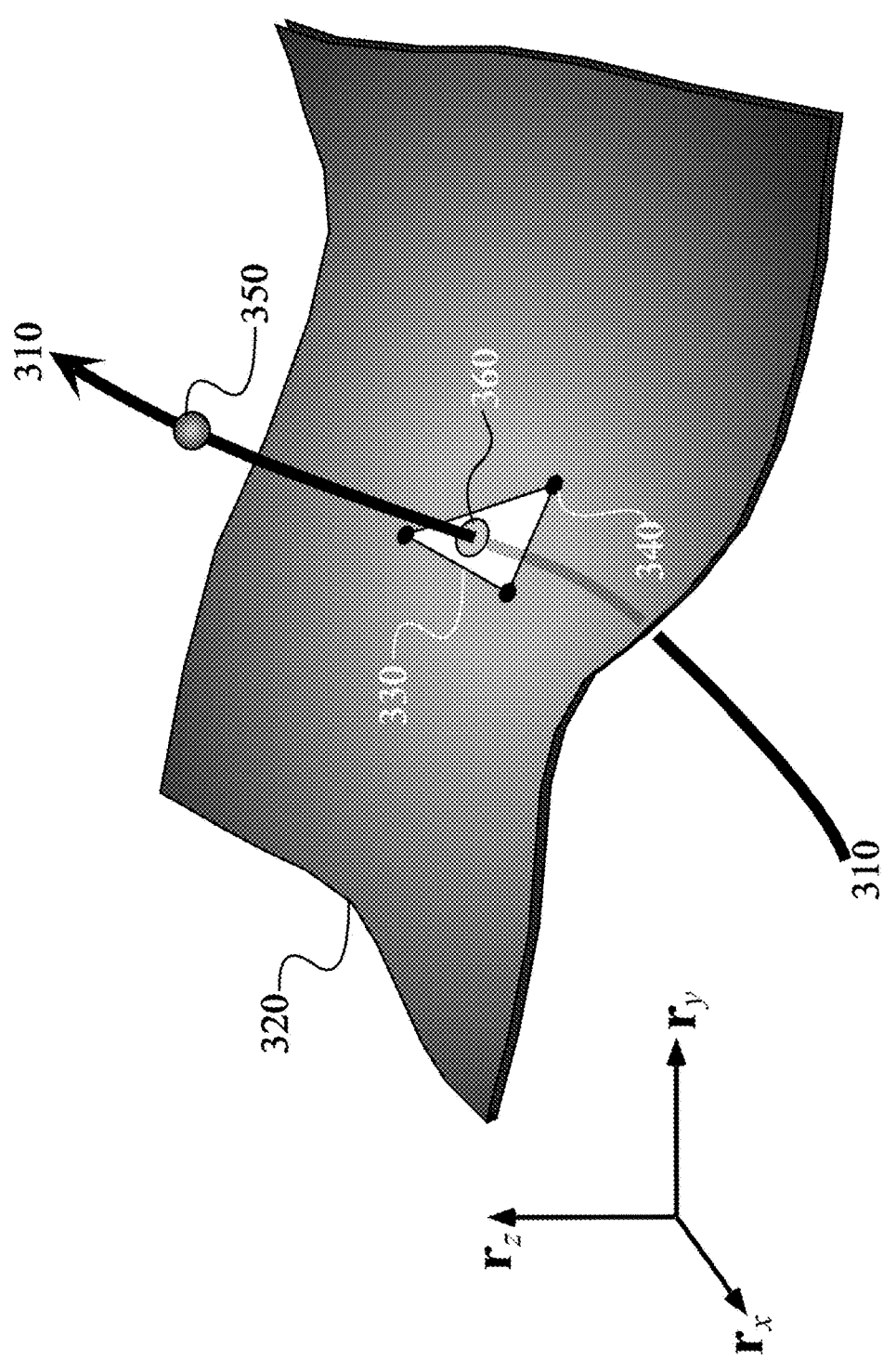
FIG. 3 is a schematic illustration of a first 2D interpolation stage of the GTR technique that transforms an initial reference geologic horizon 320 into a reshaped horizon in such a way that initial horizon points 360 become coincident with observed sampling points 350 by displacing each initial horizon points 360 along a 1D line 310 that passes through the point.
Figure 4:
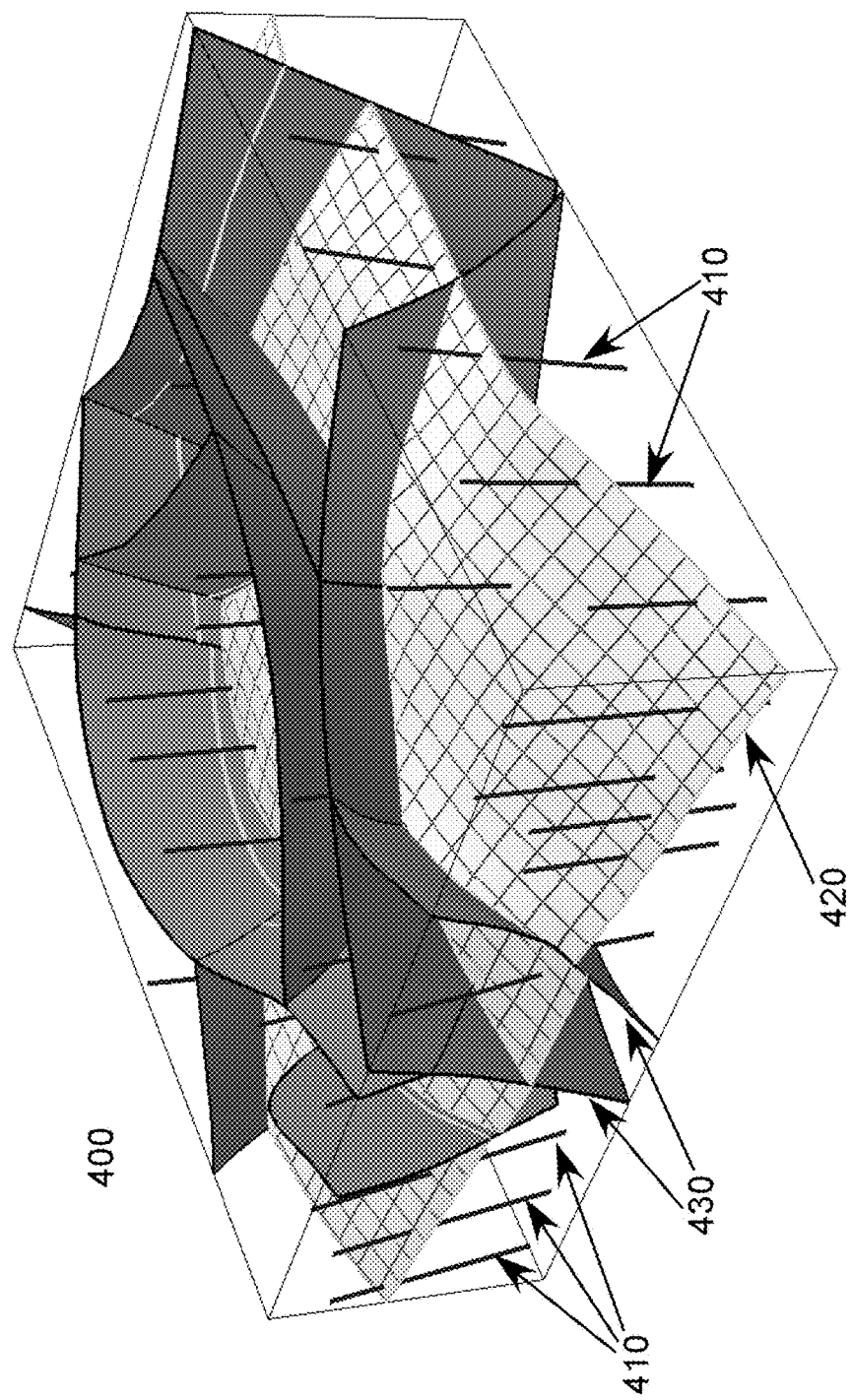
FIG. 4 is a schematic illustration of a 3D model including a 2D level set surface 420 of an initial smooth geological time function (for a 2D interpolation stage) and a plurality of 1D lines 410 (for a 1D interpolation stage), in accordance with an embodiment of the invention.

In order to determine a past depositional geological time (t) based on observed present-day geology, a depositional model such as the "GeoChron" model may be used as an input. For each particle of sediment observed today in the geological space at location "r" (e.g. r=(x,y,z)), the depositional model may provide a geological time of deposition t(r). An Iso-Paleo-Geographic (IPG) line (310 in FIG. 3 and 410 in FIG. 4) includes a set of particles of sediment (e.g. denoted IPG(u(r),v(r))) which were deposited at the same paleo-geographic coordinates {u(r),v(r)} as the particle observed today at location "r," throughout time. The level set of t(r) corresponding to a given geological time $t_i$ is a surface $H_{ti}$ (320 in FIG. 3 and 420 in FIG. 4), referred to as a geological horizon, and including particles of sediment which were deposited at substantially the same geological time $t_i$ (e.g. within the same thousands or tens of thousands of years). As shown in FIG. 4, IPG lines 410 are provided for each point "r" in the subsurface and may be viewed as a plurality of lines approximately orthogonal to the horizons 420 and discontinuous across the faults 430. In FIG. 4, the paleo-geographic coordinates (u,v) may be represented on each horizon 420 by a network of approximately orthogonal lines.

The paleo-geographic functions u(x,y,z), v(x,y,z) and t(x,y,z) of the depositional model 400 may be piecewise continuous. Typically, the only discontinuities of these functions represent subsurface fractures induced by fault surfaces 430. Model 400 may be divided along these discontinuities into fault blocks within which the functions u(x,y,z), v(x,y,z) and t(x,y,z) may be continuous.

According to embodiments of the invention, an initial 3D model of subsurface terrains is provided as an input and is further refined to produce an improved geological time function. The input 3D model may be a GeoChron model or any other 3D model that complies with one or more of the principles outlined below over a specified geological domain or space:

The topology and the geometry of a fault network may be defined;

A 3D corner point grid $\Gamma$ or mesh covering the geological space with 3D polyhedral cells T (e.g., tetrahedra or hexahedra) may be defined such that its edges do not cross the faults and there are no gaps or overlaps in the G-space;

Any function $\phi$ defined by its values $\phi(\alpha)=\phi(r(\alpha))$ at each location $r(\alpha)$ of node $\alpha \in \Gamma$ may be referred to as a "discrete function", for example, defined on $\Gamma$. For any point r inside a cell $T \in \Gamma$, the value $\phi(r)$ may be obtained by local interpolation of the values $\{\phi(\alpha): \alpha \in \Gamma(T)\}$ where $\Gamma(T)$ is a subset of $\Gamma$ in a given neighborhood of T;

An initial geological-time discrete function "t" defined on $\Gamma$ may be given. In practice, "t" may be assumed to be strictly monotonic and there may be one distinct geological-time function per geological sequence. In practice, the geological-time discrete function "t" may be a pseudo-geological time function defined as a strictly monotonic (e.g. arbitrary) function approximating the (e.g. unknown) actual geological-time;

A pair of discrete functions (u,v) defined on F may be given such that, for a particle of sediment observed today at a location "r", the numerical values $\{u(r), v(r)\}$ represent the paleo-geographic coordinates of "r" at the (initial) geological time $t(r)$ when this particle was deposited;

Each horizon $H_{ts}$ may be defined as a level-set surface of the function t, for example, as in equation (1):

$$r \in H_{ts} \Leftrightarrow t(r) = t_s \quad (1)$$

An increasing series of reference geological-times $\{t_1 \ldots ; t_n\}$ may be defined, for example, by equation (2):

$$t_1 < t_2 < \ldots < t_n \quad (2)$$

Each level-set surface $H_{ti}$ of the given initial geological time t defined by equation (1) may be referred to as an "initial reference horizon." It may be observed that:

each initial reference horizon $H_{ti}$ 320 is a surface composed, for example, of adjacent 2D-cells 330 sharing common nodes (vertices) 340;

each 2D-cell 330 of $H_{ti}$ 320 may be composed of a polygonal facet C 330 corresponding to the intersection of $H_{ti}$ 320 with a 3D-cell $T=T(C)$ belonging to the 3D-grid $\Gamma$;

the grid induced by the edges and the vertices of $H_{ti}$ may be input into a 2D interpolation described below according to embodiments of the invention, to interpolate on $H_{ti}$ any 2D discrete function defined by its values at the nodes (vertices) of $H_{ti}$.

A line or curve referred to as Iso-Paleo-Geographic "IPG"-line denoted $IPG(u^\diamond; v^\diamond)$ (140 in FIG. 1, 310 in FIG. 3 and 410 in FIG. 4), may be defined as a curve in the geological space with points representing a set of particles of sediment which were deposited at the same paleo-geographic coordinates $(u^\diamond; v^\diamond)$ throughout geological-time, for example, as shown in equation (3)

$$r \in IPG(u^\diamond; v^\diamond), \Leftrightarrow \begin{cases} u(r) = u^\diamond \\ v(r) = v^\diamond \end{cases} \quad (3)$$

where the symbol "$\diamond$" refers to constant values of u and v.

Each IPG-line may be parameterized by the initial geological-time "t". In other words, if the location in the geological space of the particle of sediment deposited at paleo-geographic coordinates $(u^\diamond; v^\diamond)$ is denoted as $r^\diamond(t^\diamond)$ for geological time $t^\diamond$ then, there exists a parametric representation $r^\diamond(t^\diamond)$ of the line $IPG(u^\diamond; v^\diamond)$ which may be defined, for example, as in equation (4):

$$\{r^\diamond(t^\diamond) = r(u^\diamond, v^\diamond, t^\diamond) \forall t\} \rightarrow \{r^\diamond(t^\diamond) \in IPG(u^\diamond, v^\diamond) \quad \forall t^\diamond\} \quad (4)$$

For the sake of clarity, the following notation conventions may be used herein: For any entity X representing a function or geometric object:

if capped with a "^" sign, $\hat{X}$ may be defined independently from the 3D-grid $\Gamma$;

if superscripted with a "*" sign, X* refers directly or indirectly to the refined geological-time function.

The two notations may be combined to designate an entity $\widehat{X^*}$ which both depends on the refined geological-time function and is independent from the 3D-grid $\Gamma$.

Problems with Modeling the Geological Time Function

For each reference geological-time $t_i$, horizon $H_{ti}$ may include a surface approximating a given set $\mathcal{H}_{t_i}$ of data points "x" called "refined-scale information," for example, as defined in equation (5):

$$\forall i: \mathcal{H}_{t_i} = \{x', x'', \ldots\} \quad (5)$$

Embodiments of the invention may provide a device, system and method for replacing an initial geological-time discrete function t with a new or updated geological-time discrete function t*, referred to as a "refined" geological-time function, for example, which better fits the data points defined by equation (5) than the initial geological-time function. Refined geological-time function t* may also be defined on the 3D-grid $\Gamma$ and may be characterized, for example, by the constraints in equation (6):

$$(i) \ t^*(x) \approx t_i \forall x \in \mathcal{H}_{t_i}; \forall i \quad (6)$$

$(ii)$ grad $t^*$//grad $t$ approximately

In accordance with this notation and to conform to equation (1), the following notation may be used to define a level-set surface $H^*_{t_s}$ of the refined geological-time discrete function t*, for example, according to equation (7):

$$r \in H^*_{t_s} \Leftrightarrow t^*(r) = t_s \quad (7)$$

Equation (6)(i) specifies that each level-set surface $H^*_{t_i}$ of the refined geological-time discrete function t* fits the refined-scale information defined by the data points $\{\mathcal{H}_{t_1}, \ldots, \mathcal{H}_{t_n}\}$. Equation (6)(ii) specifies that the shape of these new level-sets are, as much as possible, approximately similar to the shape of the initial horizons deduced from the initial geological-time function t.

Similarly to level-set surfaces $H_{t_i}$, refined level-set surfaces $H^*_{t_i}$ may have the properties that:

each level-set $H^*_{t_i}$ is a surface composed of adjacent 2D-cells sharing common nodes (vertices); and each 2D-cell of level-set $H^*_{t_i}$ is composed of a polygonal facet C corresponding to the intersection of $H^*_{t_i}$ with a 3D-cell $T=T(C)$ belonging to the 3D-grid $\Gamma$.

According to embodiments of the invention, to reshape each reference horizon $H_{ti}$ into a "refined" surface $\widehat{H^*_{t_i}}$, the proposed geological time refinement technique may displace model points representing particles of sediment, for example, according to equation (8):

$$r \in H_{t_i} \to r^* \in \hat{H}_{t_i}^*, \quad (8)$$

Subject to: shape $\{\hat{H}_{t_i}^*\} \simeq$ shape $\{H_{t_i}^*\}$ where "shape" is defined, for example, by eqn. 6(ii), indicating the direction of a gradient of the geological time function.

In order to avoid generating mutual or self-intersecting surfaces $\{\widehat{H_{t_1}^*}, \ldots, \widehat{H_{t_n}^*}\}$, the transformation $H_{ti} \to \widehat{H_{t_i}^*}$ may be performed in a coherent way. For that purpose, specific constraints may be taken into account to ensure that each 1D line 310 crosses the reshaped surfaces $\{\widehat{H_{t_1}^*}, \ldots, \widehat{H_{t_n}^*}\}$ at initial geological times sorted in the same order as the given reference geological times $\{t_1 < t_2 < \ldots < t_n\}$.

As of today, all of the classical interpolation mechanisms explicitly or implicitly assume that the gradient of the geological-time function t is continuous within each fault block, and in particular, across the reference horizons. For example, but not limited to, this is the case for Splines, NURBS, RBF or Kriging interpolation methods. This observation related to conventional methods has the following consequences:

1. The level-sets of the geological-time function interpolated according to conventional methods are smooth without sharp curvatures variations. In other words, the "flexibility" (internal energy) of the level-sets is minimized. As a direct consequence, any function interpolated with one of these conventional methods is inevitably $C^1$ within each fault block.
2. Local regions where the geological-time function is not $C^1$, for example, across some horizons, cannot be taken into account. As illustrated in FIG. 1, local discontinuities may correspond to some sedimentation styles (e.g. passive margin) frequently encountered in geology and associated with rapid lateral variations of the layer thickness between the horizons. As a consequence of the inability of conventional $C^1$ interpolators to correctly interpolate the geological time of sampling data points in $\{\mathcal{H}_{t_1}, \ldots, \mathcal{H}_{t_n}\}$, where the geological time may not be $C^1$, for example, across reference horizons, conventional interpolators may model the geological-time function as non-monotonic around these discontinuities, which may form "bubbles" in the model. Therefore, when such a situation occurs, the level-sets (horizons) of the geological-time function modeled with classical interpolation methods cannot correctly fit the sampled data points $\{\mathcal{H}_{t_1}, \ldots, \mathcal{H}_{t_n}\}$. In the presence of strong lateral variation of layers thickness, these errors induced by the "Gibbs effect" are magnified, distorting the geological models with unrealistic results.

Removing the "Gibbs Effect"

Figure 2:
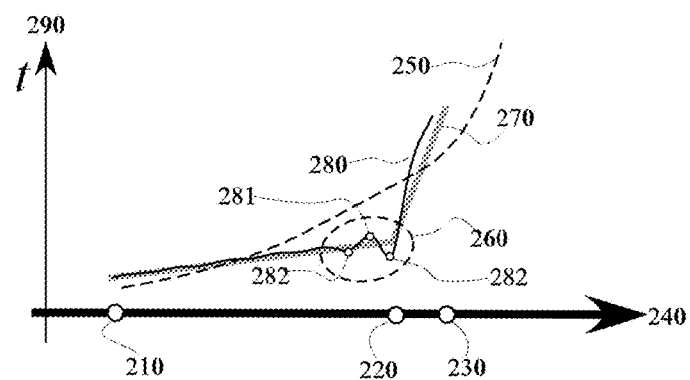
FIG. 2 is a graph of the "Gibbs effect" at points 281 and 282 along a 1D line 280 resulting from applying an interpolator that is $C^1$ to a geological time that is not $C^1$, such as in FIG. 1, in accordance with an embodiment of the invention.

As shown in FIG. 2, when a conventional $C^1$ non-linear interpolator is applied to a geological-time function that is locally not $C^1$, the interpolated geological-time function 280 may suffer from the "Gibbs effect" which causes oscillations 260 of its gradient in the neighborhood of the $C^1$-discontinuities. These oscillations may induce changes in the orientation of the gradient, for example, meaning that the gradient of the interpolator reduces to zero at some locations 290. As a consequence, in the neighborhood of the $C^1$-discontinuities, the interpolated geological-time function may become non-monotonic. This is physically unlikely or impossible since, for physical reasons, a geological-time function should be monotonic. When the geological-time function is non-monotonic, its level-sets may be closed surfaces (e.g. bubble-shaped), which is unlikely or impossible for geological horizons.

As shown in FIG. 2, only $C^0$ (e.g., piecewise-linear) interpolators 270 avoid the Gibbs effect. This observation is at the origin of the design of the GTR, which according to embodiments of the invention, within each layer bounded by reshaped reference horizons 520 and 521, is a 1D-piecewise-linear interpolator along each segment of 1D line, for example, bounded by the intersection points 551 and 553 of 1D line 510 with reshaped reference horizons 520 and 521.

Geological Time Refinement (GTR)

Embodiments of the invention propose a new interpolation technique, referred to as "Geological Time Refinement (GTR)" that refines the geological-time t by allowing the gradient of the refined geological-time function t* to be discontinuous across the refined reference horizons $\{H^*_{t_1} \ldots H^*_{t_n}\}$. Between each pair of reference horizons, the GTR technique achieves this by applying a 1D-piecewise-linear interpolator along each 1D interpolation line (e.g. IPG line), which allows discontinuities in the gradient of the geological-time function t (not $C^1$) across the reference horizons.

Reference is made to FIG. 4, which is a 3D model 400 including a 2D surface 420 along which the 2D interpolation is performed and a plurality of 1D lines 410 along which the 1D interpolation is performed, in accordance with an embodiment of the invention. Horizon 420 is a level-set $H_{ti}$ of the initial geological time throughout which the geological time "t" is constant. 1D lines 410 may correspond to points where the paleo-geographic coordinates "u" and "v" are respectively constant, which are referred to as IPG-lines. The IPG-lines are generally discontinuous across fault surfaces 430 and typically do not cross each other.

1D lines 410 may be approximately orthogonal to the 2D reference horizons 420 at the intersection of 410 and 420 and may be such that, one and only one 1D line 410 passes through each point r in the 3D geological space. The paleo-geographic coordinates $\{u(r), v(r)\}$ may define a plurality of 1D (e.g. IPG) lines 410. The GTR technique interpolates in 1D along the 1D lines 410 to build a piecewise continuous function "t̂*", for example, approximating the refined geological-time function "t*" while keeping independent from the 3D-grid Γ.

The GTR technique includes two stages including a series of 2D interpolations on reference horizons 420 followed by a series of 1D interpolations along 1D (e.g. IPG) lines 410:

1. (2D stage)→For each reference geological-time $t_i$, the GTR technique may transform reference horizon 420 into reshaped surface $\hat{H}^*_{t_i}$, for example, as follows:
   (a) Generate horizon surface $H_{t_i}$ 420 as a level-set of the initial geological-time function t (e.g. a surface having a constant geological-time t);
   (b) for each sampling point x 350 with a geological time along 1D line 310 (e.g. IPG(u(x),v(x))) passing through x, compute the mismatch from x to the initial reference horizon $H_{t_i}$ with the same geological time ti and assign this mismatch as a control point value on $H_{t_i}$ 320 at a location 360 corresponding to the intersection of the initial reference horizon $H_{t_i}$ with the 1D line 310 passing through x. Since all sediment deposited at geological time $t_i$ should lie along horizon $H_{t_i}$ (i.e. zero mismatch distance), this mismatch between the sampling data point and the horizon $H_{t_i}$ may be measured either as a linear distance or a difference of the initial geological time t(x) at sampling point location and $t_i$.

(c) interpolate in 2D the mismatch everywhere on $H_{t_i}$. This interpolated mismatch may comply with inequality constraints (15) below in order to prevent the reshaped surfaces $\{\hat{H}^*_{t_1}, \ldots, \hat{H}^*_{t_n}\}$ from intersecting each other. For that purpose, one may, for example use a 2D-DSI interpolation method.

(d) Move each point r of $H_{t_i}$ 420 for example, according to equation (8), along the 1D line (e.g. IPG(u(r); v(r))) 410 passing through r to a new location $r^* \in IPG(u(r); v(r))$ in such a way that the reshaped surface $\hat{H}^*_{t_i}$ so obtained both fits the observed data while keeping, as much as possible, the same shape as the initial reference horizon $H_{t_i}$:

$$H_{t_i} \to \hat{H}^*_{t_i}$$

In order to fit the data points, the magnitude and direction of the displacement along the 1D line 410 passing through r may be a magnitude and direction defined by the mismatch computed at location r at previous step (c) in the direction along the 1D line 410 toward the horizon $H_{t_i}$.

(e) Remove all parts of reshaped surface $\hat{H}^*_{t_i}$ which are moved across a fault 430 when displaced in step (d);

(f) For each point r located on the reshaped surface $\hat{H}^*_{t_i}$, assign to $\hat{t}^*(r)$ a constant value equal to $t_i$.

Figure 5:
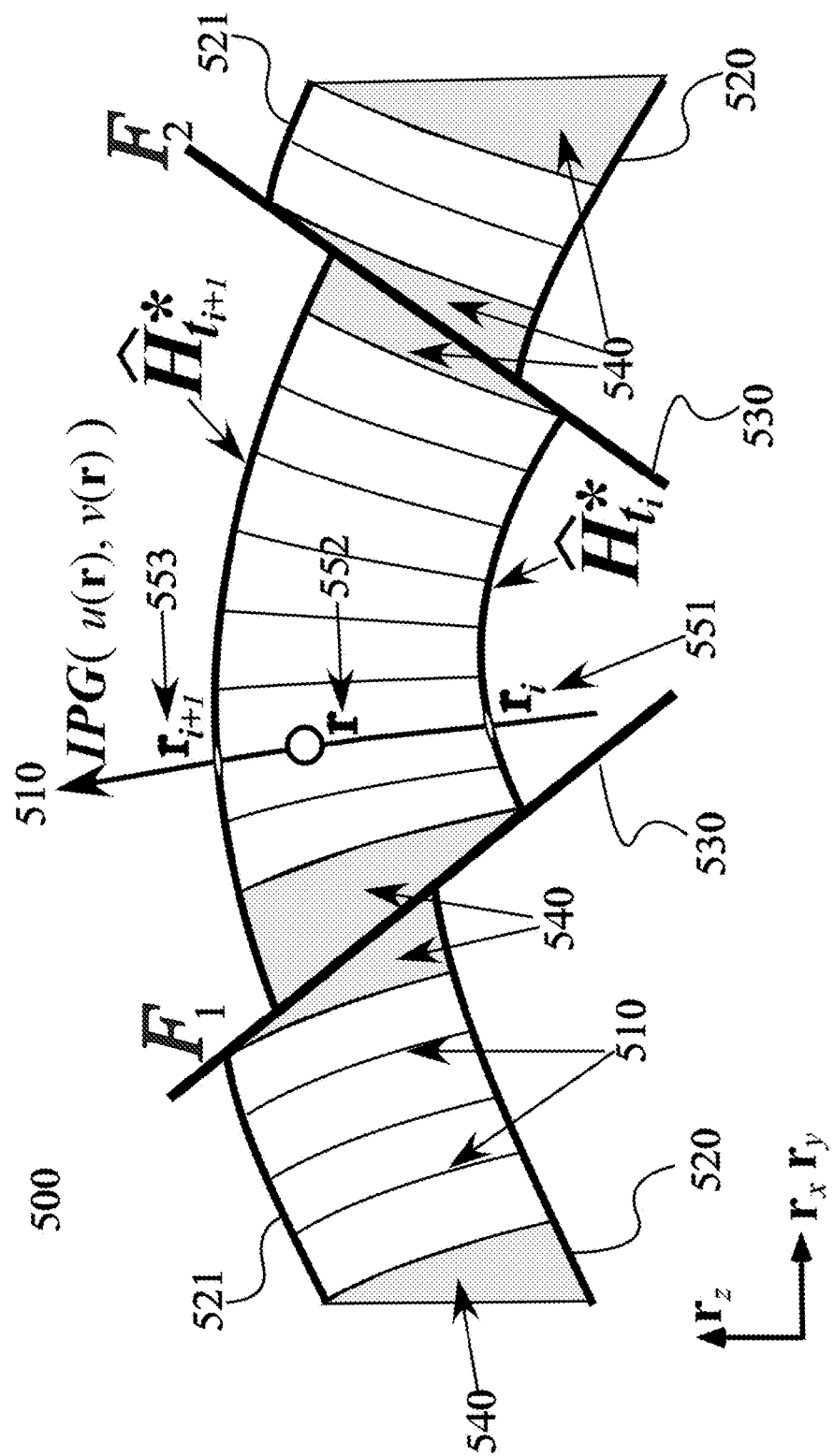
FIG. 5 is a schematic illustration of a second 1D interpolation stage of the GTR technique used to compute the refined geological time in a vertical cross-section along 1D line 510 between a pair of reshaped (refined) horizons 520 and 521 in accordance with an embodiment of the invention.

2. (1D stage)→Following the 2D stage, at each point r 552 in the 3D space, the GTR technique may compute the refined geological time $t^*(r)$ at that point. Reference is made to FIG. 5 which schematically illustrates a cross-section of a reshaped version of the model in FIG. 4 used to execute a 1D interpolation to compute the refined geological time $t^*(r)$, in accordance with an embodiment of the invention. First, the numerical value $\hat{t}^*(r)$ may be computed, for example, as follows:

(a) Identify the 1D line 510 (e.g. IPG (u(r); v(r))) passing through r;

(b) Identify which reshaped horizons surfaces $\hat{H}^*_{t_i}$ 520 and $\hat{H}^*_{t_{i+1}}$ 521 are nearest to r. The distance to r may be measured along the 1D line 510 (e.g. IPG(u(r); v(r)));

(c) Define two points $r_i$ 551 and $r_{i+1}$ 553 as the intersections of IPG(u(r); v(r)) with reshaped horizons surfaces $\hat{H}^*_{t_i}$ 520 and $\hat{H}^*_{t_{i+1}}$ 521, respectively;

(d) If $r_i$ 551 or $r_{i+1}$ 553 does not exist or the segment $\{r_i, r_{i+1}\}$ is cut by a fault 530 or the border of the studied domain, then r is located inside a shadow region 540 and the interpolation proceeds as follows:
assign no value (e.g. a No-Data-Value (NDV)) to $\hat{t}^*(r)$; stop.

(e) Compute a barycentric coordinate $\lambda(r)$ of the point r with respect to points $r_i$ 551 and $r_{i+1}$ 553, for example, as follows:

$$\lambda(r)=l(r;r_i)/l(r_i;r_{i+1}) \qquad (9)$$

where $l(r_1; r_2)$ represents the arc length between two points $r_1$ and $r_2$ located on the same 1D (e.g. IPG) line 510;

(f) Define and compute $\hat{t}^*(r)$ for the point r, for example, as follows:

$$\hat{t}^*(r)=\{1-\lambda(r)\}\cdot t_i+\lambda(r)\cdot t_{i+1} \qquad (10)$$

(g) stop.

In the frame of the GTR technique, the 1D lines need not be IPG lines and may be instead any field of curves approximately orthogonal to the horizons, for example, provided that no more than one such curve passes through each point in the 3D domain where the geological time is interpolated. As an example but not limited to, the IPG lines may be replaced by the field of lines constantly tangent to the gradient of the initial geological time.

Whereas the final refined geological time $t^*$ is a discrete function, the function $\hat{t}^*$ is not a discrete function and, as such, is independent from the 3D-grid $\Gamma$. As a consequence, the refined geologic-time discrete function $t^*$ solution may be defined as a sampling of $\hat{t}^*$ at the nodes of the 3D-grid $\Gamma$:

$$t^*(\alpha)=\hat{t}^*(r(\alpha)) \forall \alpha \in \Gamma \qquad (11)$$

In the 2D interpolation stage above, steps 1. (b) and (c) describe how mismatch values may be computed from the reference horizons and observed (real-world) sampling points to be honored. Equivalently, the 2D stage may interpolate any function that enables such reshaping of the reference horizons so that they match the observed data points. For example, the initial geological time function itself may be used to determine where each vertex of the reference horizons should be moved so that the geometry of the reshaped horizons match the observed data points.

The barycentric coordinate $\lambda(r)$ of a point r located between a pair of points $(r_1; r_2)$ along a 1D line may represent the location of r (e.g. its relative proximity) with respect to the locations of $r_1$ and $r_2$. $\lambda(r)$ may vary continuously and strictly monotonically, for example, from 0 to 1, when r moves from $r_1$ to $r_2$ along the 1D line. In the example of equation (9), the barycentric coordinate $\lambda(r)$ is defined with respect to the arc length $l(r_1; r_2)$ between a pair of points $(r_1; r_2)$ along the 1D (e.g. IPG) line 510 passing through r. However, other definitions of the barycentric coordinate $\lambda(r)$ may be used. For example, the barycentric coordinate $\lambda(r)$ may be defined with respect to the initial geological time t(r), for example, as follows:

$$\lambda(r) = \frac{t(r) - t(r_i)}{t(r_{i+1}) - t(r_i)} \qquad (12)$$

Figure 8:
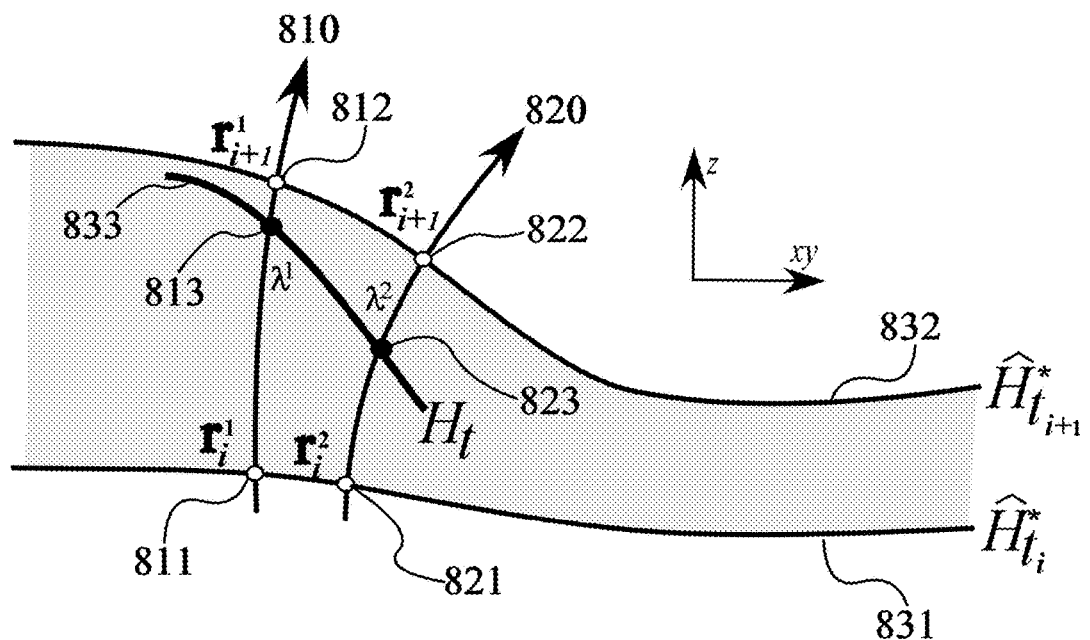
FIG. 8 is a schematic illustration of a 1D interpolation stage of the GTR technique that takes into account the geometry of an intermediary horizon 833 to compute the refined geological time between two reshaped (refined) reference horizons in accordance with an embodiment of the invention.
Figure 8:
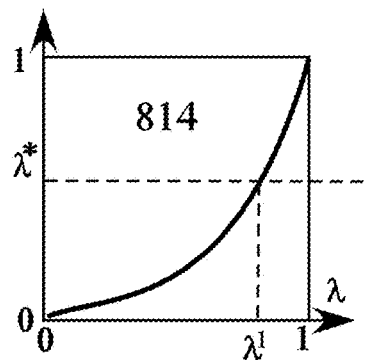
Figure 8:
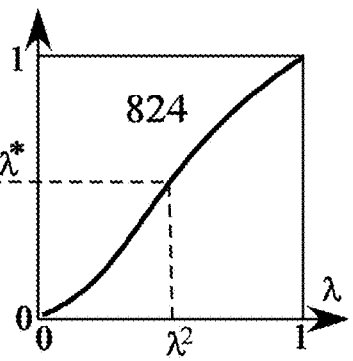

For each segment of 1D line 510 bounded by two points $r_i$ 551 on 520 and $r_{i+1}$ 553 on $\hat{H}^*_{t_{i+1}}$ 521, the barycentric coordinate $\lambda(r)$ may also be replaced as follows by a transformed barycentric coordinate $\lambda^*(r)$ defined by $$\lambda^*(r)=T(\lambda(r)|r_i,r_{i+1})$$

where T is a given strictly monotonically increasing transfer (e.g. rescaling) function of $\lambda$, for example, that changes if the pair of points $r_i, r_{i+1}$ is changed. Transfer function T may depend on the 1D line passing through $r_i$ 551 on $\hat{H}^*_{t_i}$ 520 and $r_{i+1}$ 553 on $\hat{H}^*_{t_{i+1}}$, for example, with values in the range [0,1], and may be designed to take into account information related to the geometry of the strata between $\hat{H}^*_{t_i}$ and $\hat{H}^*_{t_{i+1}}$. For example but not limited to, as shown in FIG. 8, this geometric information may represent the geometry of a patch on an intermediary horizon $H_t$ 833 with unknown geological time "t" observed in a seismic cube between a pair of reshaped reference horizons $\hat{H}^*_{t_i}$ 831 and $\hat{H}^*_{t_{i+1}}$ 832. The reshaped reference horizons $\hat{H}^*_{t_i}$ 831 and $\hat{H}^*_{t_{i+1}}$ 832 may be intersected at points $r^1_i$ 811 and point $r^1_{i+1}$ 812 by 1D line 810 and the same pair of reshaped reference horizons $\hat{H}^*_{t_i}$ 831 and $\hat{H}^*_{t_{i+1}}$ 832 may be intersected at points $r^2_i$ 821 and point $r^2_{i+1}$ 822 by an adjacent IPG line 820. In such a case, as shown in FIG. 8, if the patch $H_t$ is intersected at barycentric coordinates $\lambda^1$ (point 813) by 1D line 810 and is intersected at barycentric coordinates $\lambda^2$ (point 823) by 1D line 820, then the transfer functions $T(\lambda|r^1_i, r^1_{i+1})$ and $T(\lambda|r^2_i, r^2_{i+1})$ may be computed to honor the following constraint:

$$T(\lambda^1|r^1_i, r^1_{i+1}) = T(\lambda^2|r^2_i, r^2_{i+1})$$

According to this constraint, $\lambda^{*1} = T(\lambda^1|r^1_i, r^1_{i+1})$ and $\lambda^{*2} = T(\lambda^2|r^2_i, r^2_{i+1})$ may be equal. As a consequence, if $\lambda^1$ is the initial barycentric coordinate of point $r^1$ 813 and $\lambda^2$ is the initial barycentric coordinate of point $r^2$ 823, then using $\lambda^{*1}$ in place of $\lambda^1$ and $\lambda^{*2}$ in place of $\lambda^2$ in equation (10) may be equivalent to the (unknown) geological time t of intermediary horizon $H_t$ 812 belonging to the range $[t_i, t_{i+1}]$ and taking the same value at locations 813 and 823.

At step (2.d) of the GTR technique, there are points in shadow regions 540, for example, located near faults F 530 or at the edge of the modeled domain, where the GTR procedure returns no data value for $\hat{t}^*(r)$ and where the function $\hat{t}^*$ is therefore not defined. These regions may be treated as special cases to extend the refined geological-time function in these regions, for example, using the DSI method under the following constraint where W is a vector field tangent to the 1D lines:

$$W \cdot \text{grad } t^* > 0$$

This constraint may be equivalent to the refined geological time strictly monotonically increasing along the 1D lines.

Swapping Γ for Another 3D-Grid Γ'

As pointed out above, the function $\hat{t}^*$ returned by the GTR technique is not a discrete function and is independent from the initial 3D-grid Γ. Therefore, when implementing the sampling defined by equation (11), if required by a particular application, the initial 3D-grid Γ used so far to define the discrete functions u, v, and t may be replaced by a new refined 3D-grid Γ', for example, with nodes denoted as α':

$$t^*(\alpha') = \hat{t}^*(r(\alpha')) \forall \alpha' \in \Gamma' \quad (13)$$

The initial 3D-grid Γ may be replaced with the new refined 3D-grid Γ', for example, to capture the fine variations of $\hat{t}^*$, since the new 3D-grid Γ' may be of a finer resolution than the initial grid Γ.

As an example but not limited to, in the frame of seismic interpretation, 3D-grid Γ may be a coarse (e.g. tetrahedral) mesh, while 3D-grid Γ' may be a fine regular (e.g. rectilinear) 3D-grid with same resolution as a seismic cube. "Resolution" may, for example, refer to the length(s) of the edges of the grids Γ and Γ' which characterize the precision of the final sampling $t^*(\alpha')$ of $\hat{t}^*(r(\alpha'))$.

Preventing Mutual Intersections of the Reshaped Horizons

Embodiments of the invention may generate reshaped horizons $\{\hat{H}^*_{t_1}, \ldots, \hat{H}^*_{t_n}\}$ having the property that the shape of reshaped horizons are interdependent so the horizons may not intersect each other.

In order to prevent such intersections, additional constraints may be inserted, for example, at step (1.c) above, in the GTR technique. For example, if $r_{i-1}$, $r_i$ and $r_{i+1}$ are the intersection points of a 1D interpolation line 410 with the reshaped horizons $\{\hat{H}^*_{t_{i-1}}, \hat{H}^*_{t_i}, \hat{H}^*_{t_{i+1}}\}$, then the following inequality constraints may be honored:

$$s(r_{i-1}) < s(r_i) < s(r_{i+1}) \forall i \quad (14)$$

where s(r) denotes the curvilinear abscissa of r along the 1D interpolation line passing through r and oriented in the direction of increasing values of the initial geological time function t(r).

Computing the curvilinear abscissa s(r) along a 1D interpolation line may be computationally difficult and a more efficient technique is proposed to prevent intersections of the reshaped horizons. To that end, it may be observed that, along each 1D interpolation line, the initial geological time function t(r) is a strictly monotonic (e.g. increasing or decreasing) function of the curvilinear abscissa s(r). As a direct consequence, the inequality constraints (14) above are honored by the following constraints which involve only the already known initial geological time:

$$t(r_{i-1}) < t(r_i) < t(r_{i+1}) \forall i \quad (15)$$

Ensuring such inequalities (14) or (15) may provide benefits according to some embodiments of the GTR technique. From a practical perspective, such inequalities may be taken into account by the DSI interpolator. The inequality constraints (14) or (15) recursively connect all the reshaped horizons $\{\hat{H}^*_{t_1}, \ldots, \hat{H}^*_{t_n}\}$. In this regard, the 2D interpolation of the GTR technique may be considered as "almost" a 3D process. Inequality constraints (14) or (15) interconnect multiple reshaped horizon layers so that they do not intersect. This further distinguishes the GTR method from classical 2D techniques, which build each surface one at a time, independently of other surfaces, allowing horizon surfaces to intersect.

Figure 6:
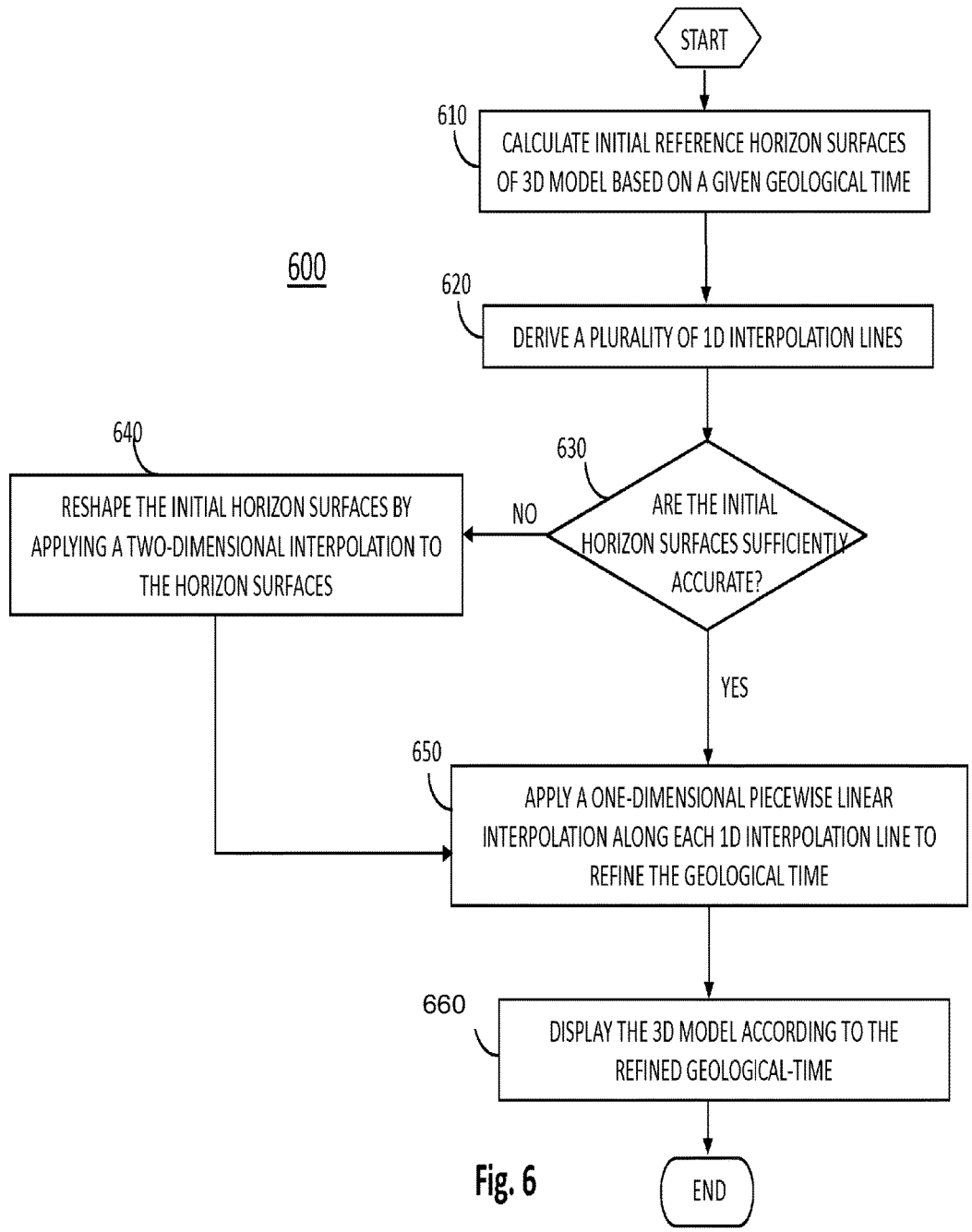
FIG. 6 is a flowchart of a method for executing the GTR technique, in accordance with an embodiment of the invention.

Reference is made to FIG. 6, which is a flowchart of a method 600 for executing the GTR technique in accordance with embodiments of the present invention. Method 600 may be executed using components of FIG. 7 or other components.

In operation 610, a process or processor (e.g. processor 710 of FIG. 7) may calculate or obtain one or more initial 2D reference horizon surfaces (e.g. 2D surfaces 420 of FIG. 4). Each 2D reference horizon surface may be defined as a level-set for an initial geological time (e.g. a surface of points having a single constant geological time).

In operation 620, a process or processor may identify, obtain or generate a plurality of 1D interpolation lines, for example, lines that are locally normal to the initial 2D reference horizon surfaces such as Iso-Paleo-Geographic (IPG) lines (e.g. lines 410 of FIG. 4). IPG lines are 1D curves in the present-day model including points that represent a set of particles in the subsurface region predicted to have been deposited at the same paleo-geographic coordinates throughout geological-time (e.g. each line of points having a constant pair of u and v values and varying throughout geological time).

In operation 630, a process or processor may determine if the one or more initial 2D reference horizon surfaces of operation 610 are sufficiently accurate. The accuracy may be determined automatically according to an optimization algorithm, manually by a user, or semi-automatically by a combination thereof. If so, a process or processor may skip operation 640 (2D interpolation) and proceed to operation 650 (1D interpolation); otherwise the process or processor may proceed to execute both operation 640 (2D interpolation) and then operation 650 (1D interpolation).

In operation 640, a process or processor may perform a 2D interpolation of the initial geological-time along each of the initial 2D reference horizon surfaces. The 2D interpolation may displace one or more points in each initial 2D horizon surface along an intersecting 1D interpolation line to generate a reshaped 2D horizon surface. The process or processor may apply a constraint that multiple reshaped 2D horizon surfaces do not intersect each other. For example, the process or processor may require points on each sequentially positioned horizon surface to have a respectively sequentially increasing geological-time value along each 1D line (e.g. according to equation (15)).

In operation 650, a process or processor may perform a 1D interpolation of the initial geological-time along one or more 1D interpolation lines to generate a refined geological-time function. The 1D interpolation lines may be locally and approximately orthogonal to the initial 2D reference horizon surfaces (as well as the reshaped 2D reference horizon surfaces having substantially the same shape).

Figure 7:
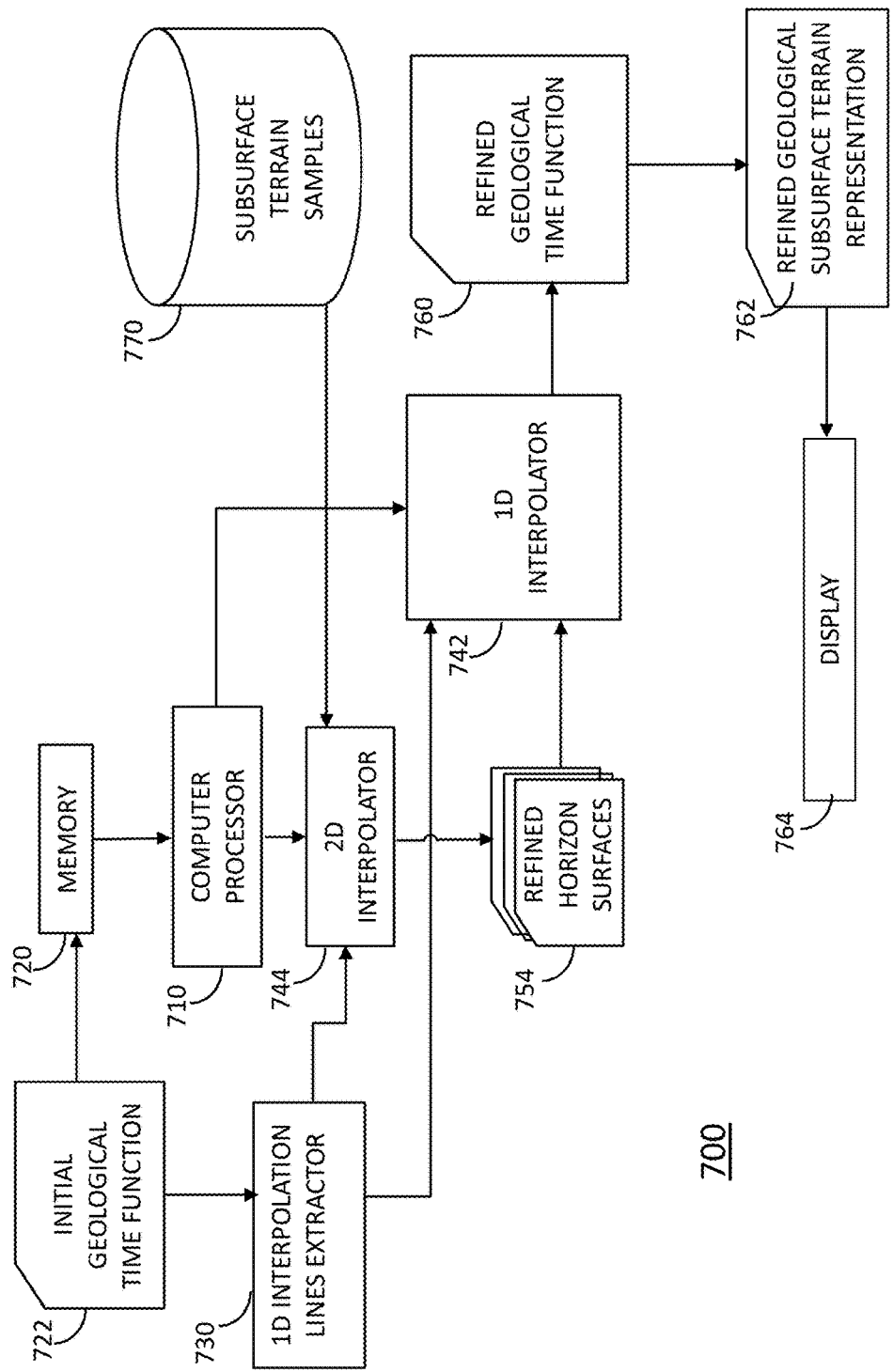
FIG. 7 is a schematic illustration of a system for executing the GTR technique, in accordance with an embodiment of the invention.

In operation 660, a process or processor may display the 3D model according to the reshaped refined geological-time on a display (e.g. display 764 of FIG. 7).

Other operations or orders of operations may be used.

Reference is made to FIG. 7, which is a system 700 for executing the GTR technique in accordance with embodiments of the present invention. System 700 may include a memory 720 configured to store an initial geological time function 722 formed based on a depositional model, such as, the GeoChron model. System 700 may include a 1D interpolation line (e.g. IPG line) extractor configured to extract the 1D interpolation lines from the depositional model. System 700 may include a computer processor configured to apply 2D interpolations via 2D interpolator 744 and 1D interpolations via 1D linear interpolator 742. 2D interpolator 744 may interpolate the initial 2D horizon surface, for example, by moving horizon points along intersecting 1D interpolation lines, to generate a reshaped 2D horizon surface 754. 1D linear interpolator 742 may interpolate along the 1D interpolation lines of refined horizon surfaces 754 to generate a refined geological-time function 760. System 700 may include a database of subsurface terrain samples 770 which is input into 2D interpolator 744 to generate the refined geological time function 760 to generate a refined geological subsurface terrain representation 762. Refined geological subsurface terrain representation 762 may be displayed at display 764.

Embodiments of the invention provide a hybrid technique merging explicit and implicit approaches:
- a "2D" stage defining an explicit modeling of each 2D level-set $\hat{H}^*_{t_i}$ of the function $\hat{t}^*$ to be interpolated;
- a "1D" stage defining an implicit 1D piecewise-linear interpolation of $\hat{t}^*$ along each 1D interpolation line.

For any point $r \in \hat{H}^*_{t_i}$, the exact value of $\hat{t}^*(r)$ computed with the GTR technique independently of the 3D-grid $\Gamma$ may be defined as being equal to $t_i$, for example, as follows:

$$\text{by definition: } \hat{t}^*(r) = t_i \forall r \in \hat{H}^*_{t_i}, \forall i \quad (16)$$

In other words, each reshaped surface $\hat{H}^*_{t_i}$ may be a part of an exact level-set of the refined function $\hat{t}^*$. This approach inverts the traditional approach in which level-sets of a function are deduced from the function itself. According to equation (16), the level-sets $\{\hat{H}^*_{t_1}, \ldots, \hat{H}^*_{t_n}\}$ may be defined "a priori" and are then used to define the function $\hat{t}^*$ (independently of the 3D-grid $\Gamma$).

Within each fault block, the function $\hat{t}^*$ generated by the GTR technique may be continuous, though its gradient may be discontinuous across each of its (reshaped) level-set surfaces $\{\hat{H}^*_{t_1}, \ldots, \hat{H}^*_{t_n}\}$. Thus, as shown in FIG. 1, the GTR technique may correctly refine horizons in the presence of strong lateral variations of layer thickness.

Variants of the GTR Technique

The GTR technique may be defined by splitting 3D interpolations of geological-time into a 2D stage followed by a 1D stage. Based on this concept, several variations in implementing the GTR technique may be used. In one example, the 3D grid $\Gamma$ may be refined in order to share the polygonal facets of each reshaped surface $\hat{H}^*_{t_i}$; one may refine the 3D grid $\Gamma$ by inserting points of each reshaped surface $\hat{H}^*_{t_i}$ new vertices (nodes) of the 3D grid $\Gamma$.

As previously mentioned, the GTR technique may return "No Data Values" (NDV) in "shadow area" neighboring faults, shown in gray in FIG. 5. According to some embodiments of the invention, in a post-processing phase, the geological time may be extrapolated in these shadow zones using the following 3D interpolation method:

1. For each vertex $r_s \in \Gamma$ where the GTR interpolation $\hat{t}^*(r_s)$ may be computed and returns a value $\hat{t}^*(r_s)$ different from a NDV, install the following control-point constraint:

$$t^*(r_s) = \hat{t}^*(r_s) \forall r_s \in \Gamma$$

2. To ensure that $t^*$ is strictly monotonic, optionally install the following constraint where $W$ is a vector field tangent to the IPG lines:

$$W \cdot \text{grad } t^* > 0$$

3. Taking the above constraints into account, apply a 3D interpolation method (e.g., the DSI method) to extrapolate $t^*$ on the part of the 3D mesh $\Gamma$ located in the shadow zones.

In some embodiments, some or all of the reshaped surfaces $\hat{H}^*_{t_i}$ may be given as "prior information" without applying the 2D part of the GTR technique. If all the reshaped surfaces $\{\hat{H}^*_{t_1}, \ldots, \hat{H}^*_{t_n}\}$ are given, the GTR technique may only apply the 1D interpolation stage;

Some embodiments of the invention may provide an incrementally refined model. Starting from an initial low resolution model, the GTR technique may add details corresponding to either new data or data which were not correctly taken into account by the initial geological-time model. The GTR technique may be run any number of iterations, each iteration taking the previous iteration as its initial geological time model. For example, the GTR technique may reset the refined geological-time and the reshaped 2D reference horizon surfaces in a current iteration to be the initial geological time and the initial 2D reference horizon surfaces, respectively, in a subsequent iteration. The 2D interpolation may then be applied to the reset initial 2D reference horizon surfaces and the 1D interpolation may then be applied to the reset initial geological-time.

In some embodiments, the 1D interpolation stage may provide, in addition to the refined geological time function itself, the gradient of this geological time function along the 1D lines. Reference is made to FIG. 5, in which the 1D interpolation stage may be used to compute a refined time value $t^*(r)$ at location r 552. The 1D interpolation stage may be used to compute the gradient of the refined geological time function grad $t^*(r)$, for example, in the direction of 1D line 552. The gradient along the 1D line tangent to W of the refined geological time function $\text{grad}_w t^*(r)$ may be computed, for example, as follows:

$$\text{grad}_w t^*(r) = \frac{t(r_{i+1}) - t(r_i)}{(r_i, r_{i+1}) \cdot W} \cdot W \quad (17)$$

where $(r_i, r_{i+1})$ denotes the vector from point $r_i$ 551 to point $r_{i+1}$ 553 and W denotes the unit vector tangent to the 1D (e.g. IPG) line 510 at location r 552.

Embodiments of the invention may provide the following advantages:
1. Both the geological-time discrete function t(r) and its associated 3D grid Γ are jointly refined in a consistent way;
2. If the initial geological-time function t(r) is strictly monotonic and the coherency of the reshaped surfaces $\{\hat{H}^*_{t_1}, \ldots, \hat{H}^*_{t_n}\}$ is preserved, the new (refined) geological-time function t*(r) will also be strictly monotonic, for example, regardless of the level of detail introduced in the proposed refinement process;
3. The GTR technique may use a 2D discrete smooth interpolation (DSI) and a 1D piecewise-linear interpolation and is therefore extremely efficient in term of both memory bulk and computational time; and
4. The list of reshaped surfaces $\{\hat{H}^*_{t_1}, \ldots, \hat{H}^*_{t_n}\}$ and the associated 1D interpolation along IPG-lines may be used to directly store the geological time function $\hat{t}^*$ without its resampling on a 3G grid Γ.

In the foregoing description, various aspects of the present invention have been described. For purposes of explanation, specific configurations and details have been set forth in order to provide a thorough understanding of the present invention. However, it will also be apparent to one skilled in the art that the present invention may be practiced without the specific details presented herein. Furthermore, well known features may have been omitted or simplified in order not to obscure the present invention. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may manipulate data representations of real-world objects and entities such as underground geological features, including faults, horizons and other features. Data received by for example a receiver receiving waves generated by an air gun or explosives may be processed, e.g., by processor 710, 1D interpolator 742, and/or 2D interpolator 744, stored, e.g., in memory 720 and/or 770, and data such as images representing underground features may be presented to a user, e.g., as a visualization on display 764.

When used herein, a map or transformation takes one or more points (x,y,z) defined in a first domain and applies a function, f, to each point to generate a new one or more points f(x,y,z). Accordingly mapping or transforming a first set of horizons or other geological structures may generate new structures according to the change defined by the transformation function or map.

When used herein, geological features such as horizons and faults may refer to the actual geological feature existing in the real world, or computer data representing such features (e.g., stored in a memory or mass storage device). Some features when represented in a computing device may be approximations or estimates of a real world feature, or a virtual or idealized feature, such as an idealized horizon or level-set as produced in a depositional model. A model, or a model representing subsurface features or the location of those features, is typically an estimate or a "model", which may approximate or estimate the physical subsurface structure being modeled with more or less accuracy.

It should be recognized that embodiments of the present invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   obtaining a three-dimensional (3D) model of a subsurface region defined by an initial geological-time in the past when particles in the subsurface region are determined to have been originally deposited;
   performing a 3D interpolation to generate a refined geological-time in stages including:
      a two-dimensional (2D) interpolation along one or more initial 2D reference horizon surfaces to generate one or more reshaped 2D reference horizon surfaces, and
      a one-dimensional (1D) interpolation based on the initial geological-time along one or more 1D interpolation lines to generate a refined geological-time, wherein each 1D interpolation line is approximately orthogonal to the initial 2D reference horizon surfaces, wherein the 1D interpolation is a 1D-piecewise-linear interpolation along each 1D interpolation line within each pair of 2D reference horizon surfaces bounding a layer; and
   displaying the 3D model of the subsurface region according to the refined geological-time.

2. The method of claim 1 comprising repeating the 3D interpolation by resetting the refined geological-time and the reshaped 2D reference horizon surfaces in a current iteration to be the initial geological time and the initial 2D reference horizon surfaces, respectively, in a subsequent iteration; and performing the 2D interpolation along the reset initial 2D reference horizon surfaces and the 1D interpolation based on the reset initial geological-time.

3. The method of claim 1, wherein the 1D interpolation generates the refined geological-time based on a rescaling function of barycentric coordinates of points along the 1D interpolation lines.

4. The method of claim 1, wherein the 1D interpolation generates the refined geological-time that is strictly monotonic between each pair of reshaped 2D reference horizon surfaces bounding a layer.

5. The method of claim 1, wherein the 1D interpolation generates values of the gradient of the refined geological-time along the 1D interpolation lines.

6. The method of claim 1, wherein the refined geological-time strictly monotonically and continuously increases across one or more local discontinuities in the gradient of the geological-time across the reshaped 2D reference horizon surfaces bounding the layer.

7. The method of claim 1, wherein the 2D interpolation displaces one or more points in the initial 2D reference horizon surfaces along a 1D interpolation line that is approximately orthogonal to the initial 2D reference horizon surfaces to generate the reshaped 2D reference horizon surfaces.

8. The method of claim 1, wherein the 2D interpolation comprises:
   obtaining one or more sampling points each associated with a geological time; and
   for each of the one or more sampling points, computing a mismatch between the sampling point and a reference horizon associated with the same geological time as the sampling point, wherein the 2D interpolation displaces each of the one or more points in the initial 2D reference horizon surfaces by a magnitude equal to the computed mismatch.

9. The method of claim 1, wherein the 2D interpolation comprises:
   obtaining one or more sampling points; and
   computing, using the initial geological time, displacements for each of the one or more points in the initial 2D reference horizon reference surfaces so that a geometry of the reshaped 2D reference horizon surfaces coincides with the one or more sampling points.

10. The method of claim 1, wherein the 2D interpolation is selectively performed along each of the initial 2D reference horizon surfaces that are determined to be inaccurate and not performed along each of the initial 2D reference horizon surfaces that are determined to be accurate.

11. The method of claim 1, wherein the 1D interpolation line is an iso-paleo-geographic (IPG) line that is a curve in the 3D model having points that represent a set of particles in the subsurface region determined to have been deposited at the same paleo-geographic coordinates throughout geological-time.

12. The method of claim 1, wherein the refined geological-time is extrapolated in 3D in areas neighboring faults.

13. The method of claim 1 comprising applying a constraint that the reshaped 2D reference horizon surfaces do not intersect other reshaped 2D reference horizon surfaces.

14. The method of claim 13, wherein points sequentially positioned along the 1D interpolation line have a sequentially increasing geological-time.

15. A method comprising:
   obtaining a three-dimensional (3D) model of a subsurface region defined by an initial geological-time in the past when particles in the subsurface region are determined to have been originally deposited;
   determining whether or not to perform a two-dimensional (2D) interpolation along one or more initial 2D reference horizon surfaces based on the accuracy of the initial 2D reference horizon surfaces;
   after performing or deciding not to perform the 2D interpolation, performing a one-dimensional (1D) piecewise-linear interpolation of the initial geological-time along one or more 1D interpolation lines to generate a refined geological-time, wherein each 1D interpolation line is approximately orthogonal to the initial 2D reference horizon surfaces, wherein the 1D interpolation generates the refined geological-time that is strictly monotonic between each pair of 2D reference horizon surfaces bounding a layer; and displaying the 3D model of the subsurface region according to the refined geological-time.

16. A system comprising:
a memory to store a three-dimensional (3D) model of a subsurface region defined by an initial geological-time in the past when particles in the subsurface region are determined to have been originally deposited;
one or more processor(s) configured to perform a 3D interpolation to generate a refined geological-time in stages including:
a two-dimensional (2D) interpolation along one or more initial 2D reference horizon surfaces to generate one or more reshaped 2D reference horizon surfaces, and
a one-dimensional (1D) interpolation based on the initial geological-time along one or more 1D interpolation lines to generate a refined geological-time, wherein each 1D interpolation line is approximately orthogonal to the initial 2D reference horizon surfaces, wherein the 1D interpolation is a 1D-piecewise-linear interpolation along each 1D interpolation line within each pair of 2D reference horizon surfaces bounding a layer; and
a display to visualize the 3D model of the subsurface region according to the refined geological-time.

17. The system of claim 16, wherein the one or more processor(s) are configured to repeat the 3D interpolation by resetting the refined geological-time and the reshaped 2D reference horizon surfaces in a current iteration to be the initial geological time and the initial 2D reference horizon surfaces, respectively, in a subsequent iteration; and performing the 2D interpolation along the reset initial 2D reference horizon surfaces and the 1D interpolation based on the reset initial geological-time.

18. The system of claim 16, wherein the one or more processor(s) are configured to perform the 1D interpolation to generate the refined geological-time based on a rescaling function of barycentric coordinates of points along the 1D interpolation lines.

19. The system of claim 16, wherein the one or more processor(s) are configured to perform the 1D interpolation to generate the refined geological-time that is strictly monotonic between each pair of reshaped 2D reference horizon surfaces bounding a layer.

20. The system of claim 16, wherein the one or more processor(s) are configured to perform the 1D interpolation to generate values of the gradient of the refined geological-time along the 1D interpolation lines.

21. The system of claim 16, wherein the one or more processor(s) are configured to perform the 1D interpolation to generate the refined geological-time that strictly monotonically and continuously increases across one or more local discontinuities in the gradient of the geological-time across the reshaped 2D reference horizon surfaces bounding the layer.

22. The system of claim 16, wherein the one or more processor(s) are configured to perform the 2D interpolation by displacing one or more points in the initial 2D reference horizon surfaces along a 1D interpolation line that is approximately orthogonal to the initial 2D reference horizon surfaces to generate the reshaped 2D reference horizon surfaces.

23. The system of claim 16, wherein the one or more processor(s) are configured to perform the 2D interpolation by:
obtaining one or more sampling points each associated with a geological time; and
for each of the one or more sampling points, computing a mismatch between the sampling point and a reference horizon associated with the same geological time as the sampling point, wherein the 2D interpolation displaces each of the one or more points in the initial 2D reference horizon surfaces by a magnitude equal to the computed mismatch.

24. The system of claim 16, wherein the one or more processor(s) are configured to perform the 2D interpolation by:
obtaining one or more sampling points; and
computing, using the initial geological time, displacements for each of the one or more points in the initial 2D reference horizon reference surfaces so that a geometry of the reshaped 2D reference horizon surfaces coincides with the one or more sampling points.

25. The system of claim 16, wherein the 1D interpolation line is an iso-paleo-geographic (IPG) line that is a curve in the 3D model having points that represent a set of particles in the subsurface region determined to have been deposited at the same paleo-geographic coordinates throughout geological-time.

26. The system of claim 16, wherein the one or more processor(s) are configured to extrapolate the refined geological-time in 3D in areas neighboring faults.

27. The system of claim 16, wherein the one or more processor(s) are configured to apply a constraint that the reshaped 2D reference horizon surfaces do not intersect other reshaped 2D reference horizon surfaces.

28. A system comprising:
a memory to store a three-dimensional (3D) model of a subsurface region defined by an initial geological-time in the past when particles in the subsurface region are determined to have been originally deposited;
one or more processor(s) configured to determine whether or not to perform a two-dimensional (2D) interpolation along one or more initial 2D reference horizon surfaces based on the accuracy of the initial 2D reference horizon surfaces and after performing or deciding not to perform the 2D interpolation, performing a one-dimensional (1D) piecewise-linear interpolation of the initial geological-time along one or more 1D interpolation lines to generate a refined geological-time, wherein each 1D interpolation line is approximately orthogonal to the initial 2D reference horizon surfaces, wherein the 1D interpolation generates the refined geological-time that is strictly monotonic between each pair of 2D horizon surfaces bounding a layer; and
a display to visualize the 3D model of the subsurface region according to the refined geological-time.

29. The method of claim 1, wherein the three-dimensional (3D) model data is subsurface region data produced in a three-dimensional space by a receiver receiving waves generated by a wave generator.

* * * * *